(12) United States Patent
Hass et al.

(10) Patent No.: US 12,738,114 B2
(45) **Date of Patent: *Sep. 15, 2026**

(54) DOOR SYSTEM WITH AUTHENTICATION AND ACTIVATION

(71) Applicant: ASSA ABLOY Accessories and Door Controls Group, Inc., Monroe, NC (US)

(72) Inventors: Brian D. Hass, Monroe, NC (US); Dustin Lawhon, Lilesville, NC (US); David M. Price, Weddington, NC (US); Henry B. Wallace, Fincastle, VA (US); Lisa Corte Lovejoy, Raleigh, NC (US); Kenya A. Moses, Marvin, NC (US)

(73) Assignee: ASSA ABLOY Accessories and Door Controls Group, Inc., Monroe, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/541,750

(22) Filed: Dec. 15, 2023

(65) Prior Publication Data

US 2024/0265757 A1 Aug. 8, 2024

Related U.S. Application Data

(63) Continuation of application No. 17/988,362, filed on Nov. 16, 2022, now Pat. No. 11,847,864, which is a (Continued)

(51) Int. Cl.

| | |
|---|---|
| ***G07C 9/22*** | (2020.01) |
| ***G06F 3/01*** | (2006.01) |

(Continued)

(52) U.S. Cl.

CPC ............... *G07C 9/22* (2020.01); *G06F 3/017* (2013.01); *G06F 3/167* (2013.01); *G06F 21/35* (2013.01); *G07C 9/27* (2020.01)

(58) Field of Classification Search

CPC .................................... G07C 9/22; G07C 9/27

See application file for complete search history.

(56) References Cited

U.S. PATENT DOCUMENTS

| | | | |
|---|---|---|---|
| 4,108,090 | A | 8/1978 | Landau, Jr. et al. |
| 5,969,637 | A | 10/1999 | Doppelt et al. |

(Continued)

FOREIGN PATENT DOCUMENTS

| | | | |
|---|---|---|---|
| CN | 108518149 | A | 9/2018 |
| CN | 108825035 | A | 11/2018 |

(Continued)

OTHER PUBLICATIONS

ASSA ABLOY Accessories and Door Controls Group, Inc., International Patent Application No. PCT/US2020/048424, International Preliminary Report on Patentability, Mar. 10, 2022.

(Continued)

*Primary Examiner* — Nabil H Syed

(74) *Attorney, Agent, or Firm* — Moore & Van Allen PLLC; Jeffrey R. Gray

(57) ABSTRACT

A detection sensor or a user device is used to aid in providing authentication and activation of a door system when a user tries to access the door for ingress and egress. Operating parameters of the door systems may be set to allow ingress and egress only when a user is identified and authorized. As such, the operating parameters of the door systems may include authentication and activation parameters such that the door systems are controlled, at least in part, based on the presence of a user and/or a user device and the identification of the specific user. As such operating parameters may be different for different users or types of users. Moreover, the user device may be used to authenticate a user and control ingress and egress through the door automatically or through an authentication action taken by the user.

20 Claims, 10 Drawing Sheets

Related U.S. Application Data continuation of application No. 17/005,545, filed on Aug. 28, 2020, now Pat. No. 11,532,192.

(60) Provisional application No. 62/894,333, filed on Aug. 30, 2019.

(51) Int. Cl.

| | |
|---|---|
| ***G06F 3/16*** | (2006.01) |
| ***G06F 21/35*** | (2013.01) |
| ***G07C 9/27*** | (2020.01) |

(56) References Cited

U.S. PATENT DOCUMENTS

| | | | | |
|---|---|---|---|---|
| 6,316,892 | B1 | 11/2001 | Valencia | |
| 7,021,597 | B2 | 4/2006 | Vogt | |
| 7,816,879 | B2 | 10/2010 | Taheri et al. | |
| 7,971,316 | B2 | 7/2011 | Copeland, II et al. | |
| 8,390,219 | B2 | 3/2013 | Houser | |
| 8,407,937 | B2 | 4/2013 | Houser | |
| 8,499,495 | B2 | 8/2013 | Houser et al. | |
| 8,884,760 | B2 | 11/2014 | Zenisek et al. | |
| 9,514,583 | B2 | 12/2016 | Zasowski et al. | |
| 9,822,553 | B1 | 11/2017 | Ho et al. | |
| 9,978,265 | B2 | 5/2018 | McNabb | |
| 10,087,673 | B1 | 10/2018 | Rosenmarkle et al. | |
| 10,249,122 | B1 * | 4/2019 | Aksamít | G07C 9/00309 |
| 10,903,765 | B2 | 1/2021 | Knight et al. | |
| 2002/0191819 | A1 * | 12/2002 | Hashimoto | G06V 40/10 382/118 |
| 2009/0146777 | A1 | 6/2009 | Fitzgibbon et al. | |
| 2011/0016971 | A1 | 1/2011 | Yulkowski et al. | |
| 2012/0159852 | A1 | 6/2012 | Houser et al. | |
| 2012/0321136 | A1 * | 12/2012 | Lobean | G06V 40/25 382/103 |
| 2014/0325911 | A1 | 11/2014 | Hass | |
| 2015/0228134 | A1 | 8/2015 | Tehranchi et al. | |
| 2015/0262438 | A1 | 9/2015 | Zasowski et al. | |
| 2016/0010379 | A1 | 1/2016 | Sauerwein et al. | |
| 2016/0284142 | A1 | 9/2016 | Elbling et al. | |
| 2017/0193724 | A1 | 7/2017 | Johnson et al. | |
| 2017/0221289 | A1 | 8/2017 | Trani | |
| 2018/0072535 | A1 * | 3/2018 | Hiltunen | H04W 4/80 |
| 2018/0225780 | A1 * | 8/2018 | Boss | G07C 9/27 |
| 2019/0003236 | A1 | 1/2019 | Hall et al. | |
| 2019/0024438 | A1 | 1/2019 | Budd et al. | |
| 2019/0147676 | A1 | 5/2019 | Madzhunkov et al. | |
| 2019/0188936 | A1 | 6/2019 | Sivill et al. | |
| 2019/0249481 | A1 | 8/2019 | Cate et al. | |
| 2019/0252814 | A1 | 8/2019 | Richardson et al. | |
| 2019/0292835 | A1 | 9/2019 | Soderqvist | |
| 2020/0087115 | A1 | 3/2020 | Dhumal et al. | |
| 2021/0005036 | A1 | 1/2021 | Johnson et al. | |

FOREIGN PATENT DOCUMENTS

| | | | |
|---|---|---|---|
| JP | 2008202275 | A | 9/2008 |
| WO | 2016150951 | A1 | 9/2016 |
| WO | 2018057591 | A2 | 3/2018 |
| WO | 2018104258 | A1 | 6/2018 |
| WO | 2020186201 | A1 | 9/2020 |

OTHER PUBLICATIONS

ASSA ABLOY Accessories and Door Controls Group, Inc., International Patent Application No. PCT/US2020/048424, International Search Report and Written Opinion, Mar. 23, 2021.

ASSA ABLOY Accessories and Door Controls Group, Inc., Canadian Patent Application No. 3,149,550, Office Action, Sep. 28, 2023.

ASSA ABLOY Accessories and Door Controls Group, Inc., Canadian Application No. 3,149,550, Office Action, Jul. 2, 2024.

ASSA ABLOY Accessories and Door Controls Group, Inc., European Patent Application No. 20781409.6, Communication pursuant to Article 94(3) EPC, Jan. 14, 2025.

* cited by examiner 38
44
48
51
40
86
56
87
42
92
50
34
135
206
44

38
44
54
86
56
40
82
74
72
80
87
60
64
68
70
42
50
92
52
10
32
26
58
34
136
44
104
30

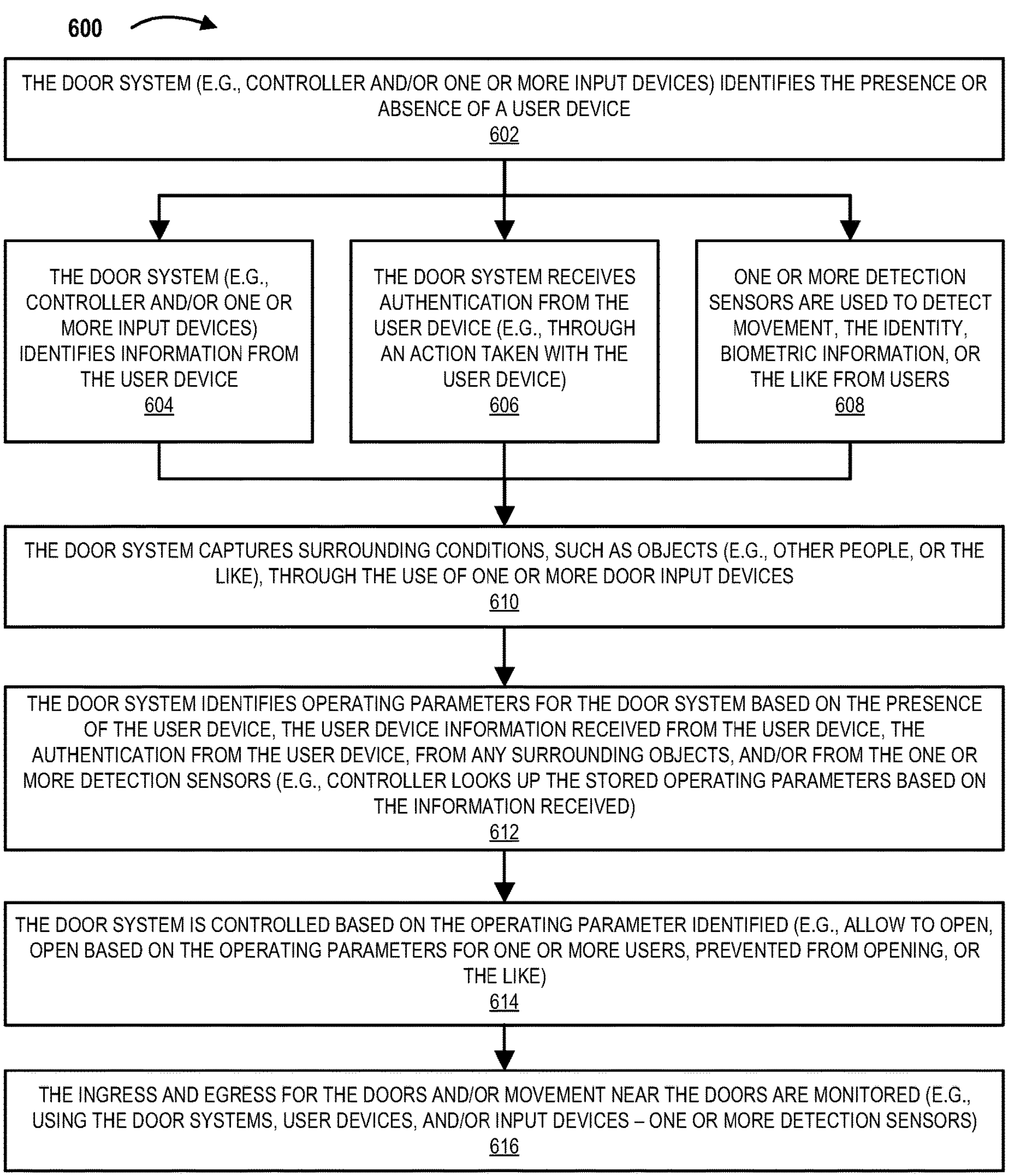
*FIG.* 5b

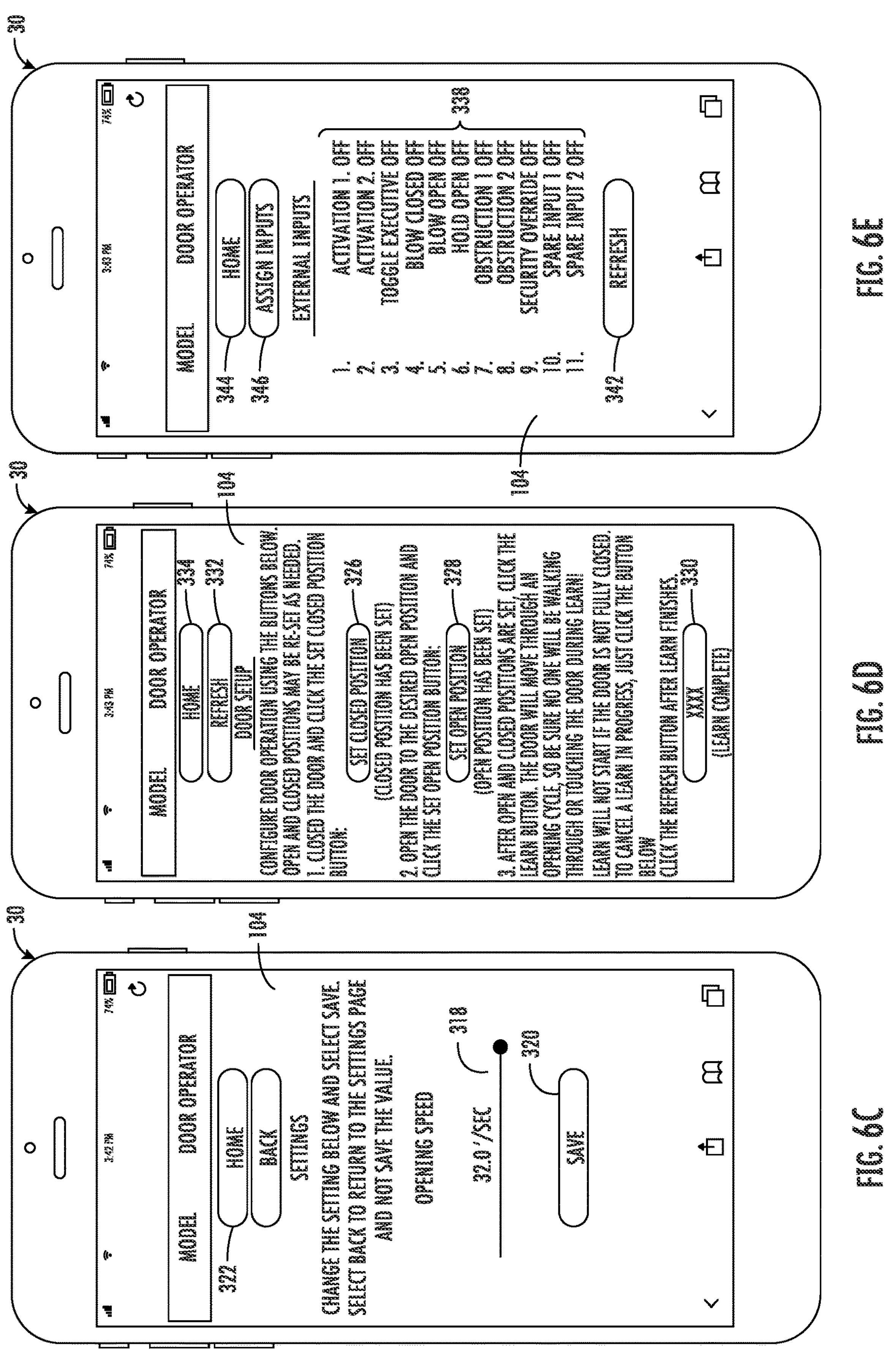
30
MODEL
DOOR OPERATOR
HOME
BACK
SETTINGS
CHANGE THE SETTING BELOW AND SELECT SAVE.
SELECT BACK TO RETURN TO THE SETTINGS PAGE
AND NOT SAVE THE VALUE.
OPENING SPEED
32.0 '/SEC
318
320
SAVE
322
104
FIG. 6C
30
MODEL
DOOR OPERATOR
HOME
REFRESH
DOOR SETUP
334
332
104
CONFIGURE DOOR OPERATION USING THE BUTTONS BELOW.
OPEN AND CLOSED POSITIONS MAY BE RE-SET AS NEEDED.
1. CLOSED THE DOOR AND CLICK THE SET CLOSED POSITION
BUTTON:
SET CLOSED POSITION
326
(CLOSED POSITION HAS BEEN SET)
2. OPEN THE DOOR TO THE DESIRED OPEN POSITION AND
CLICK THE SET OPEN POSITION BUTTON:
SET OPEN POSITION
328
(OPEN POSITION HAS BEEN SET)
3. AFTER OPEN AND CLOSED POSITIONS ARE SET, CLICK THE
LEARN BUTTON. THE DOOR WILL MOVE THROUGH AN
OPENING CYCLE, SO BE SURE NO ONE WILL BE WALKING
THROUGH OR TOUCHING THE DOOR DURING LEARN!
LEARN WILL NOT START IF THE DOOR IS NOT FULLY CLOSED.
TO CANCEL A LEARN IN PROGRESS, JUST CLICK THE BUTTON
BELOW
CLICK THE REFRESH BUTTON AFTER LEARN FINISHES.
XXXX
330
(LEARN COMPLETE)
FIG. 6D
30
MODEL
DOOR OPERATOR
HOME
ASSIGN INPUTS
344
346
EXTERNAL INPUTS
338
1. ACTIVATION 1. OFF
2. ACTIVATION 2. OFF
3. TOGGLE EXECUTIVE OFF
4. BLOW CLOSED OFF
5. BLOW OPEN OFF
6. HOLD OPEN OFF
7. OBSTRUCTION 1 OFF
8. OBSTRUCTION 2 OFF
9. SECURITY OVERRIDE OFF
10. SPARE INPUT 1 OFF
11. SPARE INPUT 2 OFF
REFRESH
342
104
FIG. 6E 38
44
40
54
86
56
82
74
72
80
87
60
68
64
70
42
50
92
52
10
32
26
58
28
34
136
44
NETWORK
35
104
30

38
44
40
54
86
56
82
74
72
80
60
64
68
70
42
87
50
52
92
10
26
58
32
34
206
204
208
136
44
104
30

DOOR SYSTEM WITH AUTHENTICATION AND ACTIVATION

CROSS REFERENCE AND PRIORITY CLAIM UNDER 35 U.S.C. § 119

The present application for a Patent is a continuation of and claims priority to U.S. Pat. No. 11,847,864 entitled "Door System with Authentication and Activation", issued on Dec. 19, 2023, which claims priority to U.S. Pat. No. 11,532,192 entitled "Door System with Authentication and Activation", issued on Dec. 20, 2022, which claims priority to U.S. Provisional Patent Application Ser. No. 62/894,333 entitled "Door System with Authentication and Activation," filed on Aug. 30, 2019, all of which are assigned to the assignees hereof and hereby expressly incorporated by reference herein.

FIELD

The present invention relates to door systems with smart authentication and activation, and more particularly to utilizing a smart wireless communication and/or input and output devices on the door systems to access and set operating parameters, and further utilizing user devices and sensors to authenticate and activate or deactivate the door systems.

BACKGROUND

Door systems may include door operators, door closers, or other like systems that control the operation of opening and/or closing a door. A door operator is a device that is able to open and/or close a door or other barrier, or that aids in opening and/or closing a door or other barrier. Door operators typically include a motor that is connected to a door via a linkage to control motion of the door. Door operators come in a variety of styles and configurations. In existing door operators, after the door operator is physically installed, an installer must open the door operator case and set the operating parameters and features using push buttons, potentiometers, dip switches and various interactive hardware devices. This installation process requires the installer to manually access the door operator, typically on a ladder, and to individually set up the operating parameters and features for each door operator. Door closers are similar to door operators; however, door closers are designed for manual opening (as opposed to automatic opening) and automatic closing. Door closers may have one or more components, which includes a motor in some cases, that are used to close or assist in closing a door or other barrier.

SUMMARY

In some embodiments a door system comprises a controller for controlling at least one operating parameter of the door system. A user computer system (e.g., a mobile device, such as a smartphone, remote control, and/or the like) may communicate with the controller over a wireless interface directly or indirectly. Alternatively, or additionally, a user may communicate with the controller through inputs and/or output devices operatively coupled to the door system. A drive system, including a motor assembly, drive train, and/or other components, is controlled by the controller where the drive system operates under the at least one operating parameter. The door systems may be door operators, door closers, or other like systems for controlling the operation of a door. As such, it should be understood that when describing features or functions related to a door operator, the same or similar features or functions may relate to a door closer or other system that controls the operation of a door. Consequently, when discussing a door operator, the phrase door operator may be substituted with door closer or other door system, which may operate in the same or similar way.

The controller of the door system may comprise a processor for operating the controller and communicating with other components of the controller and/or door system. The controller may also comprise a memory for storing instructions and data, such as the instructions and data for operating the door system. The controller may further comprise a communication interface for allowing communication with the controller and/or between the components of the controller and/or the door system. The communication interface may be a wireless communication interface that may use at least one of WiFi, Bluetooth, BLE, z-wave, Zigbee, 2G, 3G, 4G, 5G, LTE, WPAN, WirelessHD, WiGig, NFC protocols, and/or any other protocols, including any custom protocols. The controller may receive an authentication code or employ an authentication mechanism for allowing access to and/or changing the operation of the door system. The wireless communication interface may operate over short or long range and may also have a range that is adjustable to limit access to the door systems. The wireless communication interface may be on at all times, or it may require an action with respect to an input of the controller, such as activation using a physical input (e.g., key, button, touchscreen, or other like selection) to enable wireless capability of the controller. The controller may act as a server with user interfaces (e.g. web pages, application interfaces, or the like) accessible over the wireless communication interface. The user interfaces can be used for setup, diagnostics, input and output programming, settings, etc. The controller may collect data for tracking, mapping, sensors, communication with other devices, alerts/notifications of door activity, performance, maintenance, faulty accessories, installation, etc. The wireless interface may allow for the transfer of operating parameters of one door system to another door system. The wireless communication interface may be used to communicate with other systems for various features/functions such as vestibule, door interlock systems, HVAC control, door synchronization, etc. The wireless communication interface may be used to communicate with other devices such as locks, exit devices, wall plates, sensors, access control/security systems, etc.

The door systems may comprise one or more inputs devices (e.g., toggle switches, touch screen, ports, or the like) for providing control features (e.g., on/off switches, entering characters, other parameters, or the like). The inputs devices (e.g., switches, or the like) can be used for standard functionality and/or turning wireless capability on and off. The input devices may also include sensors and/or the door systems may further comprise sensors (e.g., accelerometers, force detectors, strain detectors, detection sensors—movement sensors, identification sensors, biometric sensors, or the like) for additional data collection. For example, an accelerometer may detect an orientation of the door system where the accelerometer communicates with the controller or a force detection sensor that detects the force required to close or open a door where the force detection sensor communicates with the controller. In some embodiments a door set up system (e.g., door operator set up system, door closer set up system, or the like) comprises a controller for controlling at least one operating parameter (e.g., for opening, closing, setting up, and/or trouble shooting) of the door system. A wireless interface may allow for communication (e.g., directly or indirectly) between the controller and a user computer system over an air interface. A drive system may be controlled by the controller where the drive system operates under the at least one operating parameter, which may be set using a user computer system. One or more detection sensors may be operatively coupled to the door system (e.g., a camera, radar, infrared, light curtain, pressure pad, or the like sensor), and may determine a user condition, such as the movement of a user, the identity of a user, a biometric reading of the user, or the like. The movement of a user may be utilized in order to determine if the user is going to access the door or if the user is merely passing by the door. Moreover, the movement of a user may be tracked by one or more movement sensors and/or the user computer systems in order to store patterns of use or non-use of the door systems and/or to identify if, how, and/or when a user may utilize or not utilize a door, as will be discussed in further detail herein. The one or more detection sensors may be one or more identification sensors, which detect the identify of the user, such as though the use of facial recognition, identification of the physical appearance of the user (e.g., type of clothes, color of clothes, pattern, logos, size, or the like, height, hair color, hair length, features, or the like), or other like identification information. Identification of the user may be utilized in order to allow or prevent the access of a particular user or a type of user to a particular door. The one or more detection sensors may be one or more biometric sensors that may be used to for voice recognition identification, temperature detection, indication of a user being sick (e.g., cough, or the like), or the like of users near the door, which may also be used to allow or prevent the access of a particular user (e.g., from voice recognition) or type of user (e.g., determining users that have temperatures above or below 100 degrees Fahrenheit, or the like) to a particular door. It should be understood that the one or more detection sensors may be used alone and/or in combination with the user device (e.g., user computer systems 30) in order to determine if access should be permitted to a user or a group of users. For example, while a user may be typically granted access to a door, it should be understood that the one or more detection sensors may be used to authenticate the user or override the authentication of a user or a group of users, as will be discussed in further detail herein.

In addition to using a user computer system to set up a door system, a user computer system (or other type of user device) may also be used to aid in providing authentication and activation of the door system when a user tries to access the door for ingress and egress. In particular embodiments, the operating parameters of the door systems may be set to allow ingress and egress only when a user is authorized. As such, the operating parameters of the door systems may include authentication and activation parameters such that the door systems are controlled, at least in part, based on the presence of a user device, such as the user computer system. The user device may be used to authenticate a user and control ingress and egress through the door automatically or through a "knowing act" of the user (e.g., an authentication action), as will be described herein.

It should be understood that since door systems are placed at areas of ingress and egress from buildings, they are ideally situated to integrate various security systems directly into the door system, as opposed to having a separate security system (e.g., card swipe, identification reader, RFID, or the like) that operates independently of the door system (e.g., that controls a lock on the door, or the automatic opening and closing of the door, or the like). Door systems of the present disclosure are able to control the actions of the door (e.g. locking and unlocking, controlling the opening and closing of the door) based on authentication and activation of users.

Door systems of the present disclosure may utilize a controller, door input devices (e.g., activation device, sensors—safety sensors or the like, security devices, or the like), and/or other sensors to communicate with a user device for activating the door systems. For example, a user may have a user device (e.g., handheld wireless transmitter, user computer system, or the like) to cause the door to initiate an automatic open while input devices (e.g., safety sensors) can prevent the doors from opening if an object (e.g., another user, inanimate object, or the like) is in the path of the door. The user computer system (e.g., a mobile phone, smart watch, or the like) may interact with the door system using an application installed on the user computer system. The user computer system may communicate user device information (e.g., device information, user information, or the like) to the door system allowing the door system to take specific actions when the user having the user computer system approaches the door. For example, when an authorized user approaches the door, the door system may unlock and initiate an automatic open cycle if it is equipped with a door opener. Other users may not require the use of automatic door operation and in those cases the door system can unlock the door and allow the user to open the door manually. If no door opener is present, the door will not automatically open, but the door can unlock for authorized users and/or automatically close if the door includes a door closer. Moreover, the operating parameters may only allow the use of the user device (e.g., user computer system and/or application thereof) to unlock, lock, open and/or close the door as a user approaches during certain times of the day or certain days of the week. As such, in some embodiments the operating parameters (e.g., speed, force, open time, or the like) may be set for specific users and/or groups of users.

The features of the present invention may be utilized in various situations, such as in one example, in schools to identify authorized children and/or adults that are equipped with a user device (e.g., user computer system, RFID tags, or other device) causing doors to lock if the user is not an authorized child and/or adult. Other examples of implementation may include equipping patients (e.g., patients with dementia, or other health issues), such that the patients may be allowed or denied access to ingress or egress through doors.

The door systems, door system inputs, and/or user devices may be further utilized to track ingress and egress of users within a building. That is, the door systems may be utilized to identify the entities that passed through doors within a building and/or log when the users passed through specific doors. In some embodiments, the door systems (e.g., detection sensors incorporated there in, coupled thereto, or the like) and/or the user devices (e.g., the user computer systems, or the like) may track how each user approaches, uses, and/or departs from a door. The users may be monitored for what doors the users may utilize during the day, the particular times of day users may use the door, the frequency of use of the doors by the users, the directions the users are moving when the users use the door and the directions the users are moving when the users fail to use the doors, and/or other like movements of the users over time. The tracking of the users may be stored (e.g., logged, or the like) and used to determine how a particular user or users in general approach, use, and/or depart from a door. For example, patterns may be determined for individual users, groups of users, and/or users in general, which may be utilized to identify users, operate the door systems, change the operation of the door systems, or the like. As such, when a user (e.g., specific user or a user in general) is identified near a door, the door system may or may not operate dependent on the movement of the user, as will be discussed in further detail herein. Furthermore, the door system inputs, such as security devices like cameras (e.g., video, stills, or the like), movement sensors, infrared, radar, or the like may be operatively coupled to the door systems (e.g., within or adjacent the door systems) to provide security measures. For example, a camera may be utilized to capture an image (e.g., in a video, still photo, live photo, or the like) when users pass through or use a door in order to create a record of users using a door for security purposes.

Additionally, or alternatively, the security devices can be used to allow door systems to take various actions based on a user device of a user and/or other conditions occurring around the door. For example, a door system may not unlock for a user that would have otherwise been authorized user if the security devices detect multiple users within a defined area, and one of which is not an authorized user. In other examples, the door system may not operate to unlock or open a door for an otherwise authorized user on the secure side (e.g., typically the inside) if another user (e.g., unauthorized user) is identified (e.g., located at or approaching) on the non-secure side (e.g., typically the outside) of the door.

Other door inputs devices, such as sensors (e.g., force sensors, accelerometers, or the like) could be used to detect if someone is attempting to force the door open, for additional data collection, and/or for detecting the force required to close or open a door during operation. The input devices may be further used to hold a door open and override the operating parameters if an object (e.g., person, or other object) does not move from the operating area of the door.

The user computer system that may be utilized herein to set the operating parameters of the door and/or allow the use of the door, may communicate with the controller using at least one of a WiFi, Bluetooth, BLE, z-wave, Zigbee, 2G, 3G, 4G, 5G, LTE, WPAN, WirelessHD, WiGig, NFC protocols, and/or any other protocols, including any custom protocols. The drive system may comprise a motor assembly, including a motor, controlled by the at least one operating parameter.

One embodiment of the invention comprises a door system. The door system comprises a drive system for operating a door and a controller for controlling the drive system. The controller comprises a communication interface, a memory having computer readable code stored thereon, and a processor operatively coupled to the memory and the communication interface. The processor is configured to execute the computer readable code to identify a presence of a user, identify user information of the user, identify at least one operating parameter based on the user information identified, and control the drive system based on the at least one operating parameter.

In further accord with embodiments, identifying the presence of the user comprises identifying the presence of a user device. Moreover, identifying the user information comprises identifying user device information.

In other embodiments of the system, identifying the user device comprises establishing wireless communication with the user device. Moreover, the user device is a user computer system or an access control device.

In yet other embodiments, the user computer system is a smartphone device or a smartwearable device.

In still other embodiments, identifying the user device information based on the user device comprises receiving the user device information from the user device through a wireless connection with the user device.

In other embodiments, identifying the user device information based on the user device comprises receiving a user device identifier from the user device, and accessing stored user device information using the user device identifier.

In further accord with embodiments, identifying the at least one operating parameter based on the user device information comprises accessing stored user device information for a plurality of users. The stored user device information for each of the plurality of users is assigned one or more stored operating parameters. The user device information is compared with the stored user device information. The at least one operating parameter from the one or more stored operating parameters is identified based on the comparison of the user device information with the stored user device information.

In other embodiments, the processor is further configured to execute the computer readable code to identify an authentication action from the user device. The authentication action is verified by comparing the authentication action identified from the user device with a stored authentication action for the user device. Moreover, identifying the at least one operating parameter is further based on the authentication action.

In yet other embodiments, the authentication action comprises the user making a gesture with the user device or selecting a feature on the user device.

In still other embodiments, the processor is configured to execute the computer readable code to change the at least one operating parameter from at least one past operating parameter when the user device identified is different than a previous user device.

In other embodiments, the processor is configured to execute the computer readable code to identify a presence of multiple user devices, and optimize operation of the door system based on the presence of the multiple user devices.

In further accord with embodiments, identifying the at least one operating parameter comprises identifying an operating parameter from each of the multiple user devices to determine multiple operating parameter options. The at least one operating parameter is selected from the multiple operating parameter options or creating a new operating parameter based on the multiple operating parameters options.

In other embodiments, the door system further comprises one or more detection sensors operatively coupled to the controller. The processor is further configured to execute the computer readable code to capture the user information using the one or more detection sensors, assign the user information to the user device, and store the user information and the user device information for security.

In yet other embodiments, the door system further comprises one or more detection sensors operatively coupled to the controller. The processor is further configured to execute the computer readable code to identify one or more objects in a door area of the door system using the one or more detection sensors. The at least one operating parameter is identified based on the user information is further based on the one or more objects in the door area.

In still other embodiments, the door system further comprises one or more detection sensors operatively coupled to the controller. The processor is further configured to execute the computer readable code to identify one or more objects in a door area of the door system using the one or more detection sensors during operation of the door system. The at least one operating parameter is changed during operation of the door system based on the identification of the one or more objects in the door area.

In other embodiments, the door system further comprises one or more detection sensors operatively coupled to the controller. The processor is further configured to execute the computer readable code to identify a user condition using the one or more detection sensors, and overriding the operation of the door system when the user condition is identified.

In further accord with embodiments, the door system further comprises one or more detection sensors operatively coupled to the controller. The one or more detection sensors comprise a camera, a motion sensor, a movement sensor, an infrared sensor, a radar sensor, a vision sensor, a 3D sensor, a laser sensor, or a light curtain. Moreover, identifying the user and identifying the user information occurs through the use of the one or more detection sensors.

In other embodiments, identifying the user information comprises receiving a voice command from the user. The drive system is controlled based on the voice command. The voice command is received through a microphone operatively coupled to the controller or received from a user device that received the voice command from the user.

Other embodiments of the invention comprise a method of operating a door system through the use of one or more processors. The method comprises identifying a presence of a user, and identifying user information of the user. The method also comprises identifying at least one operating parameter based on the user information identified. The method further comprises controlling a drive system based on the at least one operating parameter.

In further accord with embodiments of the method, identifying the presence of the user comprises identifying the presence of a user device. Moreover, identifying the user information comprises identifying user device information.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

The following figures illustrate embodiments of the invention, which are not necessarily drawn to scale, and wherein:

FIG. 5*b* is a block diagram illustrating a method of using the smart door system for authentication and activation, in accordance with some embodiments of the disclosure.

FIGS. 6A-6E are screen shots used in the implementation of the smart setup system, in accordance with some embodiments of the disclosure.

DETAILED DESCRIPTION

Figure 1:
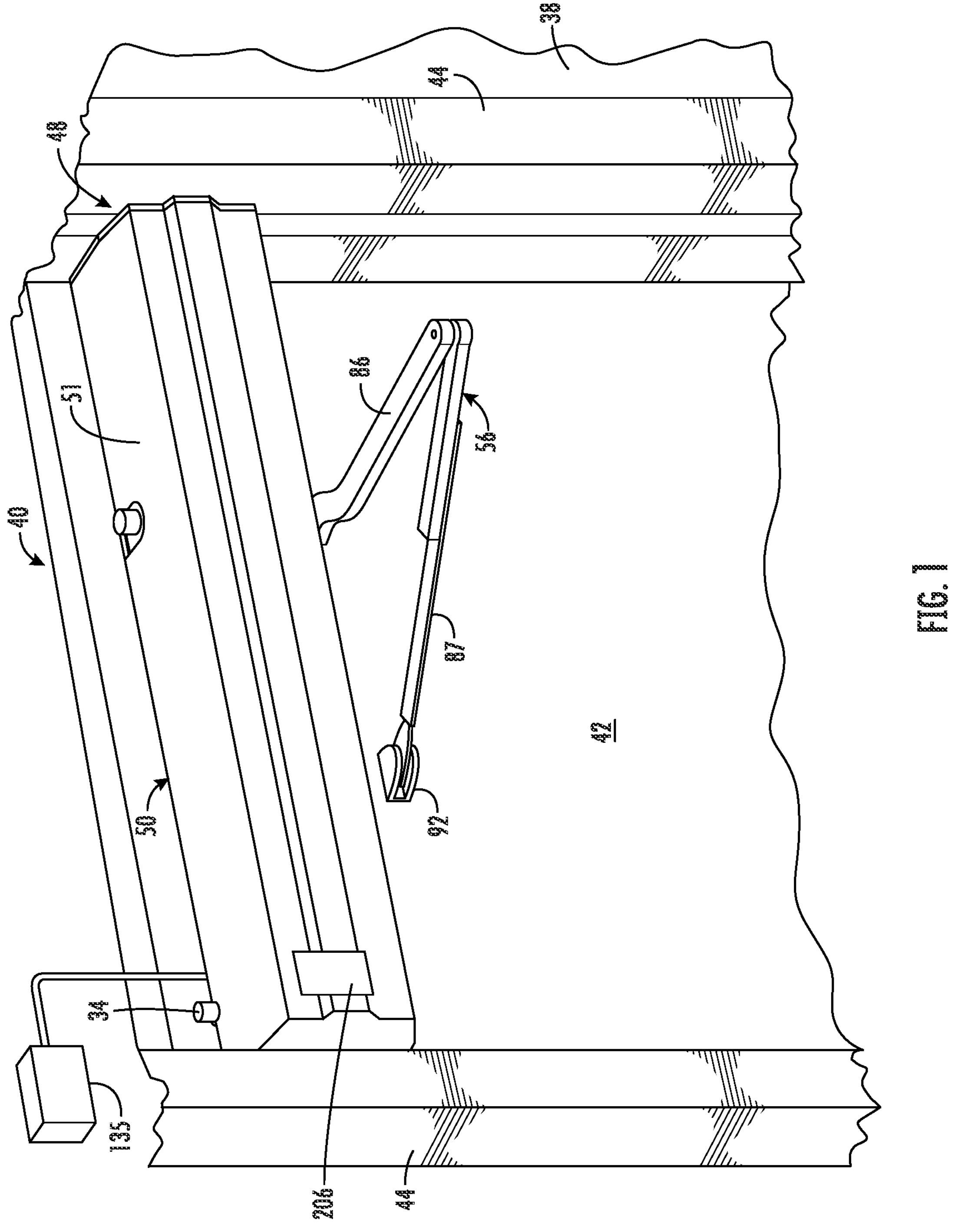
FIG. 1 is a perspective view of a door operator embodying the smart setup system, in accordance with some embodiments of the disclosure.

The following detailed description teaches specific example embodiments of the invention. Other embodiments do not depart from the scope of the present invention. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "include" and/or "including" when used herein, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and should not be interpreted in an idealized or overly formal sense unless expressly so defined herein. Certain terminology is used herein for convenience only and is not to be taken as a limitation on the invention. For example, words such as "upper," "lower," "left," "right," "horizontal," "vertical," "upward," and "downward" merely describe the configuration shown in the figures. The referenced components may be oriented in an orientation other than that shown in the drawings and the terminology, therefore, it should be understood as encompassing such variations unless specified otherwise.

It will be understood that when an element is referred to as being "connected," "coupled," or "operatively coupled" to another element, the elements can be formed integrally with each other, or may be formed separately and put together. Furthermore, "connected," "coupled," or "operatively coupled" to another element, can mean the element is directly connected, coupled, or operatively coupled to the other element, or intervening elements may be present between the elements. When two elements are connected, coupled, or operatively coupled to one another without intervening elements, the elements are referred to as directly connected, directly coupled, or directly operatively coupled. Furthermore, "connected," "coupled," or operatively coupled" may mean that the elements are detachable from each other, or that they are permanently coupled together.

It is understood that a door system (e.g., door operator, door closer, or the like) as described herein, can be any system that controls a door or other barrier to an entry, an exit, a window or the like. The door system may control a barrier that, for example, swings, slides, or rolls between the open and closed positions. For convenience only, the barrier will be referred to herein as a door and the device will be referred to as a door system (e.g., door operator, door closer, or the like); however, the invention applies to, and can be used with, other types of barriers and the use of the terms "door" and "door system", including the use of "door operator" and "door closer" are not meant to be limiting.

As used herein, the term "open position" for a door or other barrier means a door position other than a closed position, including any position between the closed position and a fully opened position (e.g., one or more "open positions"). The term "closed position" for a door or other barrier means a position in which the door or other barrier is completely shut and may be the position where the door or other barrier engages a frame and a lock or latch may be engaged.

Figure 2:
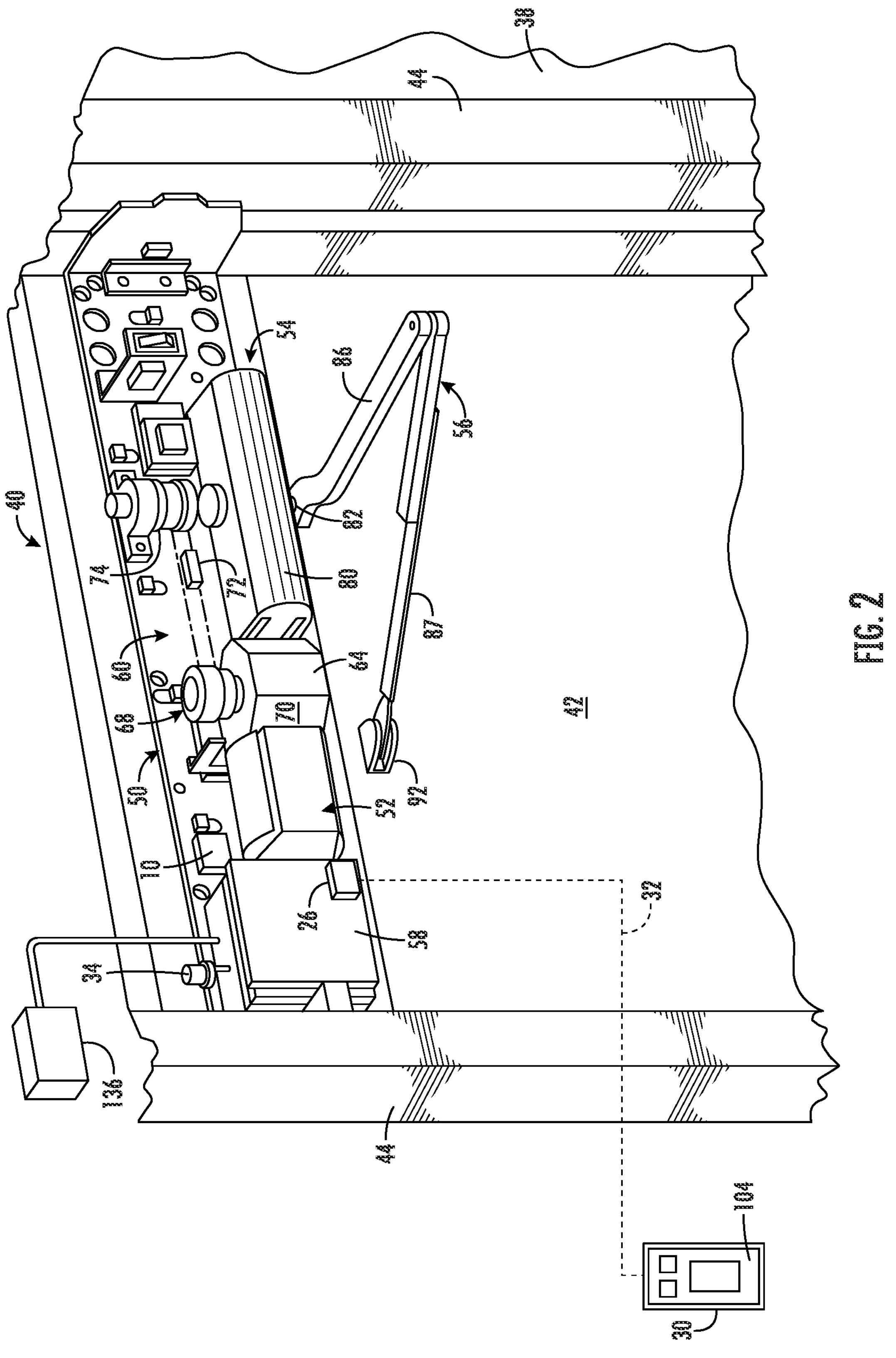
FIG. 2 is a perspective view of the door operator of FIG. 1 with the cover removed.

Referring now to the figures, wherein like reference numerals designate corresponding or similar elements throughout the several views, an embodiment of a door system (e.g., illustrated as a door operator) in which the smart setup system and methods are used is shown in FIGS. 1 and 2 and is generally designated at 40. The door system 40 is mounted adjacent to, and is operatively connected to, a door 42 in a door frame 44. The door 42 moves relative to the frame 44 between a closed position and an open position. For the purpose of this description, only the upper portion of the door 42 and the door frame 44 are shown. The illustrated door 42 is of a conventional type and is pivotally mounted to the frame 44 at hinges for swinging movement between the closed position and an open position.

The door system 40 may comprise a casing 48, otherwise described as a housing, that includes a back plate 50 and cover 51. A drive system 52 (e.g., comprising a drive train 60 and a motor assembly 62), a closer assembly 54, and/or a controller 58 are mounted in the casing 48. A linkage assembly 56 operably couples the door system 40 to the door 42. The casing 48 is shown mounted to the door frame 44, while in other embodiments the casing 48 may be mounted to the door 42. The casing 48 is typically mounted in a particular orientation, such as horizontally, with respect to the door frame 44. The cover 51 attaches to the back plate 50 and surrounds and encloses the components of the door system 40 to reduce dirt and dust contamination, and to provide a more aesthetically pleasing appearance. It is understood that door system 40 may also be concealed within the door 42, the wall 38 or the door frame 44, or it may be installed in the floor.

The motor assembly 62 may include a motor 64 (e.g., a reversible electric motor, unidirectional motor, or the like). The motor 64 may include a motor drive shaft 68. The drive train 60 is shown as including a drive gear 70 connected to drive shaft 68, a driven gear 74 connected to output shaft 82 and a chain 72 connecting the drive gear 70 to the driven gear 74. Operation of the motor 64 rotates the output shaft 82 to drive the linkage assembly 56 to open and/or close the door 42 or to assist in the opening and/or closing of the door 42. However, the motor assembly 62 may include a motor 64 and alternate components other than shafts, gears, or the like that are utilized to assist in opening and/or closing the door 42.

To close the door 42, a closer assembly 54 may be provided for returning the door 42 to the closed position after the door 42 has been opened. The closer assembly 54 may include a closer 80 of standard construction which provides a closing force on the door 42 when the door 42 is in an open position. The closer 80 may comprise a spring system, hydraulic system, pneumatic system, and/or other systems, or combinations of such systems, for providing the closing force. In other embodiments, the closing force may be supplied by the motor 64 that is used to open the door 42 or by a second motor (e.g., a closing motor).

The linkage assembly 56 is shown comprising a first rigid connecting arm link 86 and a second rigid connecting arm link 87. The first connecting arm link 86 is fixed at one end to the lower end of output shaft 82 such that the first connecting arm link 86 is rotated by the output shaft 82. The second end of the first connecting arm link 86 is pivotally connected to a first end of the second connecting arm link 87. The second end of the second connecting arm link 87 is pivotally joined to a door 42 directly or through a mounting bracket 92 fixed to the door 42. While a rigid two-arm linkage assembly 56 is shown, the linkage assembly 56 may be different than that illustrated and may include a greater or fewer number of arm linkages, sliding elements, shock absorbing arms mounting brackets 92, or the like.

While a specific embodiment of a door system 40 is shown, the door system 40 may comprise any suitable mechanisms and may use mechanisms other than, or in addition to, the illustrated components, and thus, is not limited to the embodiment shown in FIGS. 1 and 2. For example, the drive system 52 may include hydraulic, pneumatic, electrohydraulic, or electromechanical systems. The drive train 60 may comprise a gear train rather than the chain drive 72. A single reversible motor 64 may be used to provide both the opening and closing forces. Moreover, multiple motors 64 may be used where, for example, one motor opens the door and a second motor closes the door.

The controller 58 is in electrical communication with the drive system 52 (e.g., the motor assembly 62, or the like). The controller 58, which is described in detail below, controls the operation of the motor 64 (and/or other components of the door system 40) and functions to transmit appropriate control signals to the drive system 52 for actuating the motor 64 and the drive train 60. The controller 58 operates to control the drive system 52 in accordance with operating parameters stored in the door system 40. By way of example, the controller 58 may control the drive system 52 to maintain the door 42 in an open position for a selected period of time in order to allow sufficient time for a person to go through the door opening. The controller 58 may also control the speed of the motor 64 for controlling the speed of opening the door 42. Other operating parameters for controlling the operation of the door system 40 will be described. It is to be understood that although the controller 58 is shown mounted in casing 48, the controller 58 could also be housed separately from the door system 40 such as within the wall 38, a ceiling, in or on the door itself, in or on the floor, or remotely, such as in a mechanical room, for example.

The controller 58 is part of an overall control system which may include one or more activation devices 136 in electrical communication with the controller 58 for allowing a user to selectively control actuation of the motor 64, and thus, the opening and/or closing of the door 42. The one or more activation devices 136 may be typically located within 2, 4, 6, 8, 10, 12, 14, 16, or the like feet from the door 2 (or range between, overlap, or fall outside of these values). The activation device 136 is operable to generate and transmit a door movement signal to the controller 58 which, in turn, is responsive to receiving the door movement signal to control operation of the motor 64 so as to control powered opening and/or closing of the door 42. The activation device 136 may be of any known or desired type. For example, the activation device 136 may consist of a manual push pad switch mounted on the wall 38, or a post, adjacent to the door 42. This arrangement is such that a user need only press the push pad to activate the door operator 40 to automatically open the door 42. In other embodiments, the activation device 136 may comprise a pressure pad such as in a switch-type floor mat. Various other activation devices are also suitable for use according to the present invention, including any type of switch, sensor, and/or actuator, including mechanical switching device, infrared motion sensors, radio frequency sensors, photoelectric cells, ultrasonic presence sensor switches, and the like. As a result of the operation of some of these activation devices, an automatically operable door is caused to open by mere proximity of a person to the door. Such proximity may cause the door to operate by virtue of the activation device 136, such as interruption of a light beam, distortion of an electrical field, by the actual physical closing of the switch by contact with the person or in response to the weight of the person approaching the door, or the like. The particular manner for generating a door movement signal to the controller 58 for energizing the motor 64 may be accomplished by any suitable activation device.

One example door operator in which the system of the present disclosure may be used is shown in U.S. Pat. No. 8,499,495, titled "Door Operator," issued on Aug. 6, 2013 to Houser et al., which is incorporated by reference herein in its entirety. Another example door operator in which the system of the present disclosure may be used is shown in U.S. Pat. No. 8,407,937, titled "Door Operator," issued on Apr. 2, 2013 to Houser, which is incorporated by reference herein in its entirety. Another example door operator in which the system of the present disclosure may be used is shown in U.S. Pat. No. 9,514,583, titled "Controller for a Door Operator," issued on Dec. 6, 2016 to Zasowski et al., which is incorporated by reference herein in its entirety. Another example door operator in which the system of the present disclosure may be used is shown in U.S. Patent Application Publication No. US 2014/0325911, titled "Door Operator Assembly," published on Nov. 6, 2014 to Hass, which is incorporated by reference herein in its entirety.

The door systems 40 and the various components described herein may derive power from the power grid. The door systems 40 and the various components described herein may also be battery operated. In some embodiments, the door systems 40 and the various components described herein may use a battery and derive power from the power grid. In some embodiments, the door operator 40 may use a rechargeable battery. A power grid interface derives power from a power line and in turn supplies current to the door systems 40. The power supply feeds power to various components of the door systems 40 including the controller 58, motor 64, charger, battery, sensors 8 and/or the like.

While an embodiment of a door system 40 is described, door systems 40 may come in a variety of styles and may utilize a variety of operating parameters. It should be understood that a door operator 40 may both open and close the door, while a door closer may only close the door such that manual opening is used. Door systems 40 may also include manual assist where under certain conditions the door system 40 assists in the manual opening and/or closing of the door. Door systems 40 may be controlled to adjust the opening and closing speeds of the door, they may be adjusted for the size and/or weight of the door, to compensate for wind and/or stack pressure, latch retry, electronic dampening, left/right opening, or the like as will be described herein. The door systems 40 may include various inputs (e.g., activation devices 136; sensors 8—motion detectors, light curtains, accelerometers, force sensors, or the like; security devices—such as cameras, vision systems, or the like, or other like inputs) that can be used with the controller 58 and/or with communication with a user device (e.g., user computer system, fob, badge, or other user device) to control the safe operation of the door, authentication of users, monitoring of use by users, and/or the like as will be discussed herein in further detail, and in particular, with respect to FIG. 5*b*.

At least some of the parameters and/or features used to control the door system 40 and/or the components therein (hereinafter "operating parameters") are adjustable such that when a door system 40 is installed at a door 42, the user (e.g., installer, or the like) is required to set the operating parameters as part of the installation process. Some of the operating parameters may be user selected, some of the operating parameters may be manufacturer defined, some of the operating parameters may be set in response to building codes, and some of the operating parameters may limit operation of the door system 40 based on user detection and authentication, or the like. In existing door systems (e.g., door operators, door closers, or the like), after the door system 40 is installed, the case 48 must be opened and the operating parameters set by push buttons, potentiometers, dip switches and various interactive hardware devices. This requires the installer to manually access the door operator, typically on a ladder, open the case 48 and manually set the operating parameters for each door operator at the controller 58. In commercial settings this operation may require the installer to manually set a large number of door operators individually. Moreover, the user that sets the operating parameters may be different than the user that physically installs the door system such that multiple people must physically access each door system 40. The set-up operation may also require the installer to rely on wiring diagrams to determine the appropriate controller input for each operating parameter. Moreover, anytime an operating parameter needs adjusting, a user (e.g., technician, maintenance provider, or the like) must access the door system 40 to adjust the operating parameters, in the same or similar way the installer was required to access the door system 40 (e.g., using a ladder, rely on wiring diagrams, or the like). Furthermore, when the user (e.g., installer, technician, or the like) is defining (e.g., setting, adjusting, or the like) the operating parameters of the door system 40, the doors 42 may require blocking off the doorway and/or hallway, thus preventing use of the doorway so that the user can set up a ladder, manually access the hardware to set or adjust the operating parameters. In some embodiments, manual access may be required just to check the operating parameters of the door system 42.

Figure 3:
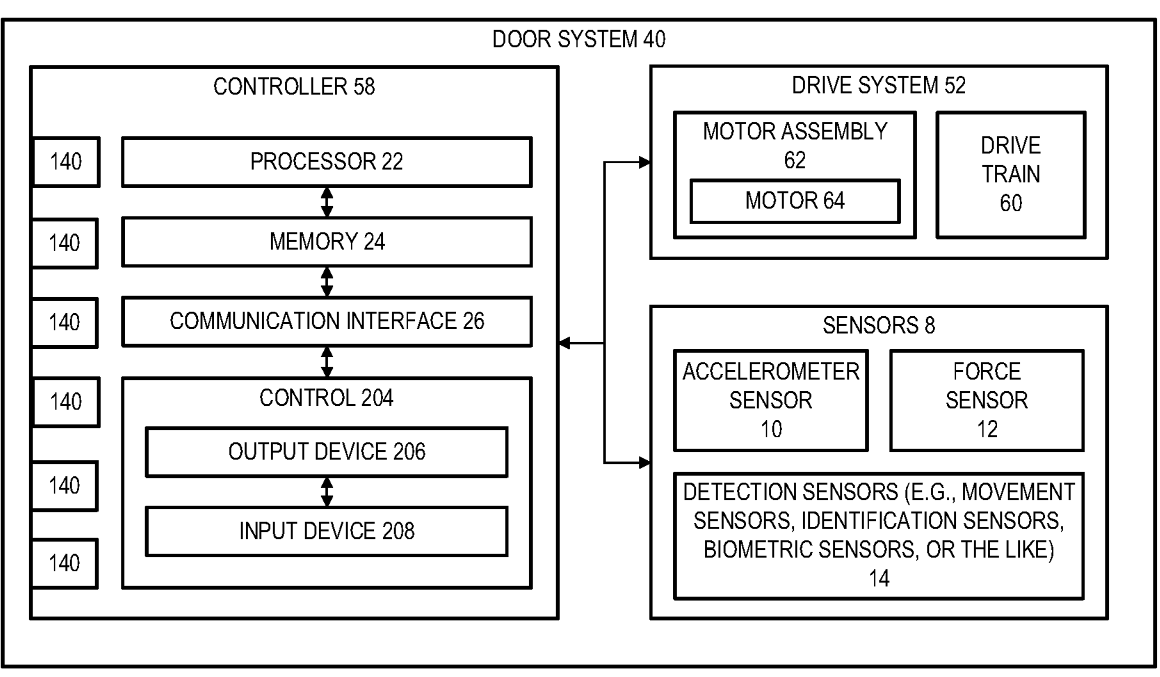
FIG. 3 is a block diagram illustrating the door operator of FIG. 1.

In some of the embodiments of the systems and methods provided herein, information is sent to and received from the door system 40 to allow controlling, monitoring and adjusting of information pertaining to the operation of the door system 40. The systems of the present disclosure may be used by any user (e.g., an installer, maintenance person, technician, or the like), for example, to configure, adjust, command, test, troubleshoot, upgrade and/or monitor a door system 40. Referring to FIG. 3, the controller 58 may comprise one or more processors 22, one or more memories 24, one or more communication interfaces 26, one or more controls 204 (which may be a type of communication interface 26 or separate from the communication interface), one or more control output devices 206 (e.g., a display, speaker, or the like), and/or one or more control input devices 208, all of which may be operatively coupled to each other. The processor 22 (e.g., a microprocessor or a microcontroller) may communicate with the memory 24 for storing and/or accessing instructions and data (e.g., computer readable instructions, the operating parameters, operation of the door system, user information related to the users that are authorized to use the door, how users use the door, other detection information, and/or the like) in order to operate the door system 40 and provide the functionality described herein. Some of the one or more memories 24 are non-volatile, storing configuration information and program code. As used herein, a "processor" generally refers to a device or combination of devices having circuitry used for implementing the communication and/or logic functions of a particular system. For example, the processor 22 may include one or more digital signal processor devices, microprocessors, and/or microcontrollers and other support circuits and/or combinations of the foregoing. Control and signal processing functions of the system are allocated between these processing devices according to their respective capabilities. The controller 58 may further include functionality to operate one or more software programs based on computer-executable program code, which may be stored in memory 24. As the phrase is used herein, a controller 58 may be "configured to" perform a certain function in a variety of ways, including, for example, by having one or more general-purpose circuits perform the function, by executing particular computer-executable program code embodied in computer-readable medium, and/or by having one or more application-specific circuits perform the function.

The door systems 40 (e.g., door operator, door closer) can include computer program code which, when executed by the processor 22, causes the door systems 40 (e.g., door operator or door closer) to perform as described herein. A computer program product can include a medium with non-transitory computer program code that when executed causes the door system 40 to operate as described herein. The present invention may be embodied as a method, device, article, system, computer program product, or a combination of the foregoing. Any suitable computer usable or computer readable medium may be utilized for a computer program product to implement all or part of the system. The computer usable or computer readable medium may be, for example but not limited to, a tangible electronic, magnetic, optical, electromagnetic, or semiconductor system, apparatus or device. More specific examples of the computer readable medium may include, but is not limited to, the following: a portable computer diskette, a hard disk, a random-access memory (RAM), a read-only memory (ROM), an erasable programmable read-only memory (EPROM or Flash memory), a portable compact disc read-only memory (CD-ROM), or an optical storage device.

Computer program code for carrying out operations of the present invention or for assisting in the carrying out of a method according to an example embodiment of the invention may be written in an object oriented, scripted or unscripted programming language such as Java, Peri, python, C++ or the like. However, the computer program code for carrying out operations of the present invention may also be written in conventional procedural programming languages, such as the "C" programming language or similar programming languages. The computer program code may also be written in HTML5 or similar languages that are commonly used for applications or "apps" intended to be run on mobile computing devices such as smart phones, tablets, and the like. While specific examples of programming languages are described herein, these examples are not exhaustive, and the computer program code may be written in any suitable programming language.

Computer program instructions may be provided to the controller 58 to produce a machine, such that the instructions, which execute via the processor 22 of the controller 58, create a device for implementing the functions necessary to carry out the embodiments as described herein. Computer program instructions may also be provided as firmware for an embedded controller or a plurality of embedded controllers.

Referring to FIG. 2, the controller 58 includes, or is in communication with, an on-board communication interface 26, such as a wired communication interface (as will be discussed below) and/or a wireless communication interface (e.g., wireless communication chip) that communicates with a user device, such as a user computer system 30 (e.g., mobile devices, such as remote control, smartphone, smart-wearable device—watches, glasses, or the like) or an access control device (e.g., badge, fob, electronic key, card, or the like) over a wireless connection 32. It should be understood that the wireless communication may occur over any type of wireless network, or such communication may occur directly between the controller 58 and the user device (e.g., user computer system 30, or the like) such that the controller 58 does not require access to an external network (e.g., external Wi-Fi network, the cellular network or other external network). As used herein, the term "directly communicates" means that the user device (e.g., user computer system 30) communicates with the on-board communication interface 26 without an intervening network such as an external wireless network (e.g., external Wi-Fi network, LAN or WAN, or other external wireless protocol). In some embodiments, the controller 58 may be directly coupled to, and may directly communicate with, an access control device and/or a user computer system 30 (e.g., a mobile device, such as a remote control, smartphone, or the like) over relatively short distance using the wireless communication interface 26. The controller 58 may be coupled to the user device (e.g., user computer system 30) via the wireless communication interface 26 that communicates using a wireless networking protocol, such as WiFi based on the institute of Electrical and Electronics Engineers (IEEE) 802.11 standards, Bluetooth short-wavelength UHF radio waves in the ISM band from 2.4 to 2.485 GHz, a proprietary communication interface or other wireless access technology whether or not described herein.

Figure 7:
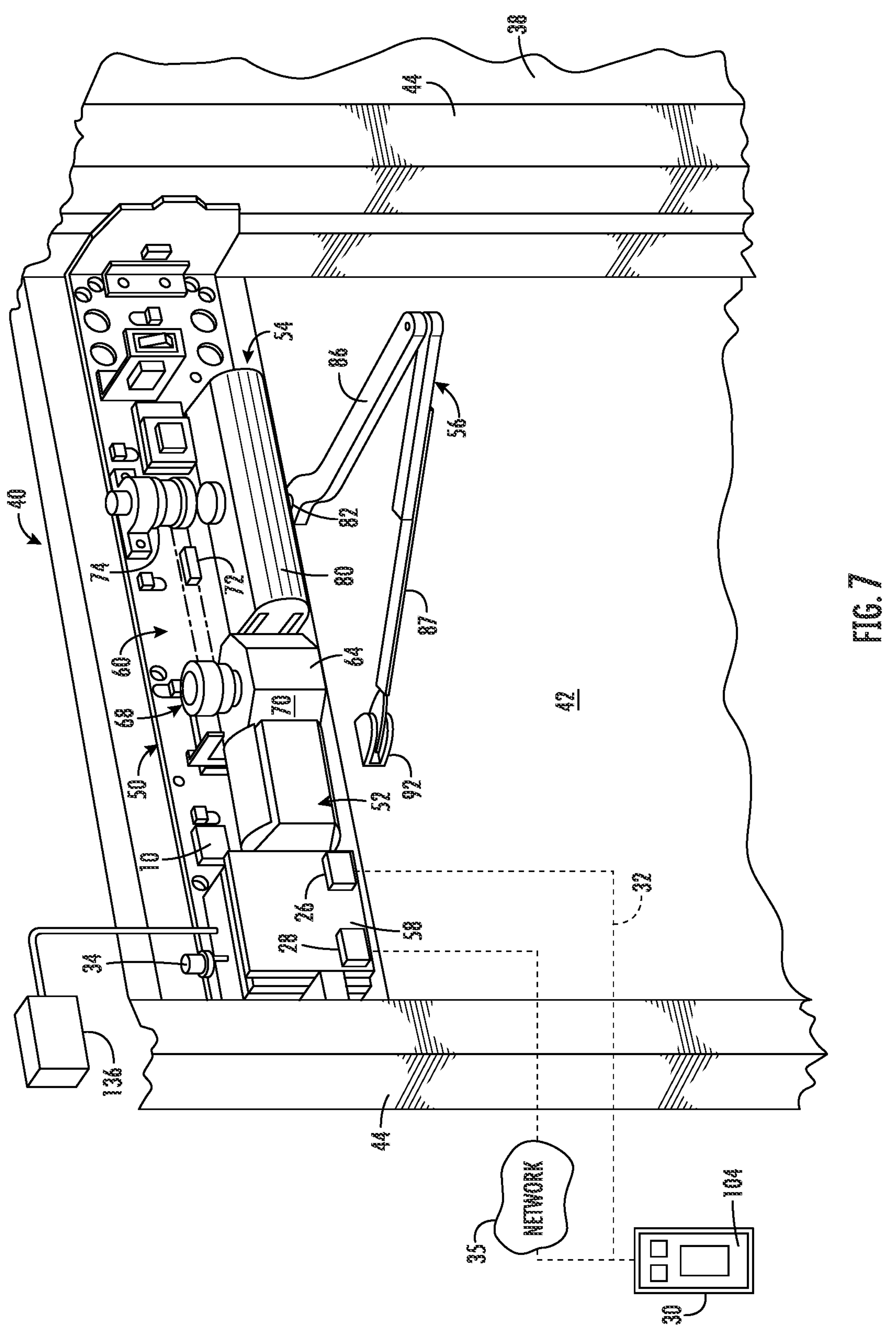
FIG. 7 is a door operator embodying the smart setup system, in accordance with some embodiments of the disclosure.

While in some embodiments, the communication interface 26 communicates directly with the user device (e.g., user computer system 30) over a short range via a wireless connection 32 such as WiFi, Bluetooth or other wireless access technology, a wireless connection 33 may operate over long or intermediate ranges and may include intervening networks 35, as shown in FIG. 7. In this regard, the door system 40 may comprise a transceiver 28 that communicates with the controller 58 and that is configured to operate with one or more air interface standards, communication protocols, modulation types, and access types. By way of illustration, the door operator may include a transceiver 28 that may be configured to operate in accordance with any of a number of first, second, third, fourth, fifth, and/or the like generation communication protocols and/or the like. For example, the door system 40 may be configured to operate in accordance with second-generation (2G) wireless communication protocols IS-136 (time division multiple access (TDMA)), GSM (global. system for mobile communication), and/or IS-95 (code division multiple access (CDMA)), or with third-generation (3G) wireless communication protocols, such as Consolidated Mobile Telecommunications System (UMTS), CDMA2000, wideband CDMA (WCDMA) and/or time division-synchronous CDMA (TD-SCDMA), with fourth-generation (4G) wireless communication protocols, with 1,TE protocols, with 3GPP protocols, with fifth-generation (5G) wireless communication protocols, and/or the like. The door operator 40 may also be configured to operate in accordance with non-cellular communication mechanisms, such as via a wireless local area network (WLAN) or other communication/data networks.

The wireless communication interface 26 may be on at all times or a user may be required to take an action with respect to an input device 208 to the controller (e.g., action with respect to a physical "key", button, touchscreen, or the like) may be required to enable wireless capability. As such, the user may enter a wireless authentication input into the door system 40. For example, a user may need to turn an on/off switch two, three, four, or other like times in order to enable the wireless communication interface 26 of the door system 40. Other actions may include selecting a pattern of physical input keys or touchscreen inputs, entering the authentication code (e.g., static, dynamic, or the like character code of numbers, letters, and/or symbols, scan a barcode, QR code, or other like code, or the like), holding multiple inputs at the same time, or the like. It should be understood that any action with respect to any input may be required, but that such an action is utilized to provide a layer of security that restricts unauthorized users from accessing the door system 40, in part, by requiring an authorized user to take an action to which only the authorized users are aware.

Additionally, or alternatively, other security measures may be provided to restrict (e.g., prevent, reduce the chance of, or the like) unauthorized access to the door system controller 58 to reduce the chance of tampering with the operating system and/or the operating parameters of the door system 40. Furthermore, to enhance the security of the system and to restrict unauthorized access to the door system 40, the wireless communication interface 26 may have a limited range such that the user computer system 30 must be in within the limited range (e.g., in close proximity) of the door system 40 in order to access the system. In some embodiments, the wireless communication interface 26 may be limited to a range of approximately 100 feet or less, 50 feet or less, 20 feet or less, or approximately 10 feet or less and may have a range of approximately 10 feet. In some embodiments, the range may be even less than 10 feet, although in a preferred embodiment the range is sufficient to allow an authorized user to gain access to the system over wireless connection 32 without the need to climb a ladder. The range may be selected such that the user computer system 30 may program a plurality of door operators at one time. For example, the range may be selected such that the user computer system 30 can access and program a plurality of door operators 40 located along a hallway in a building. Moreover, the wireless communication range can be extended, if necessary, by using a node network or a wireless communication extender. Providing the interface 26 with a limited range prevents remote unauthorized access to the system and requires any individual accessing the system to be in relatively close physical proximity to the door system 40. While specific ranges have been set forth above, it is to be understood that the range of the wireless communication interface device 26 may be increased in certain applications where a greater range is required to access the door operator and/or where unauthorized remote access is not an issue. As such, the wireless communication interface 26 of the door operator system 30 may programable (e.g., set, adjusted, or the like) by an authorized user in order to optimize the range of the wireless communication for the needs of the particular customer.

Moreover, additional security may be implemented such that the user may be required to log into the system and gain access to the controller 58. For example, the system may require that the user's identity be authenticated using a user name, a passcode, a cookie, a biometric identifier, a private key, a token, and/or another authentication mechanism. The door operator system 40 may display an authentication interface on the user computer system 30, which requires the input for user authentication. A suitable authentication response may be provided by the user, such as access code may be provided by the user to the controller 58 via the authentication interface on user computer system 30 (e.g., remote control 30, mobile device, or the like). The authentication system may use any suitable security measures that may or may not be specifically described herein.

To further enhance security of the system, the door system 40 may be provided with an on/off input 34 (e.g., a toggle switch) located on the exterior of the casing 48, or a remote location, such that the communication interface 26 is operable only when the input 34 is turned on. The input 34 may be located in a position on the casing 48 or off of the casing 48 such that the input is accessible to an authorized user but is not readily available to the general public, such as on top of the casing 48, within a access panel (e.g., cover or the like) on the casing 48, within an access panel off of the casing (e.g., on a wall, post, frame, or the like), or the like. The input 34 may be located in a position on the casing 48 or off the casing 48 along with additional security features, such as a security screw, lock, hidden access, or the like.

The controller 58 may communicate with the user computer system 30 (e.g., a mobile device, such as a remote control, smartphone, or the like) over a wireless connection 32, directly or through an external network. The user computer system 30 is used to program the door system 40 to define (e.g., set, adjust, or the like) the operating parameters of the door system 40 after the door system 40 is physically installed on the door/door frame. The user computer system 30 may comprise a mobile device, such as a cellular phone, tablet, dedicated terminal, laptop, remote control, or the like. The wireless connection 32 between the user computer system 30 and the controller 58 may be implemented using dedicated applications (e.g., apps, applet, or the like), portions of dedicated applications, a web browser-based interface, and/or the like, or combinations of such systems. The controller 58 may act as a web server providing user interfaces (e.g., web pages, or the like) that may be accessed by the user computer system 30 over the wireless connection 32. The user interfaces can be used for setup, diagnostics, input and output programming, settings, or the like. The controller 58 may collect data for tracking, mapping, sensors, and communication with other devices, notifications (e.g., alerts, messages, or the like) of door activity, performance, maintenance, faulty accessories, installation, or the like.

Figure 4:
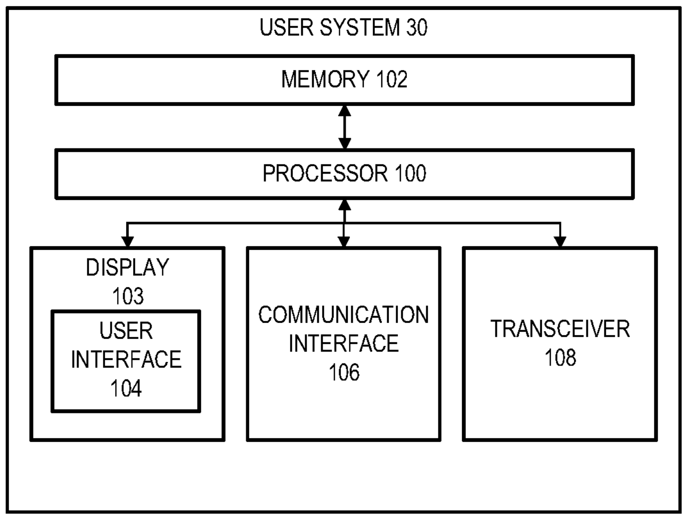
FIG. 4 is a block diagram illustrating a remote control usable in the smart setup system of FIG. 1.

The user computer system 30 may display various menus, icons, and other information to the user on a user interface 104 within a display 103 (e.g., output device) of the user computer system 30. The user can scroll through menus and icons displayed on user interface 104 to transmit information to and receive information from the controller 58. Referring to FIG. 4, the user computer system 30 comprises one or more processors 100, one or more memories 102 (e.g., having computer readable code and/or data stored thereon, such as like the memories 24 of the controller 58 described herein), one or more displays 103 (e.g., for providing a user interface 104 thereon), one or more communication interfaces 106, and/or one or more transceivers 108, or the like operatively coupled to each other. The one or more communication interfaces 106 may be made up of user output devices and/or user input devices and/or may be separate from such output and input devices. The user output devices may include the display 103 and a speaker or other audio device, which are operatively coupled to the processor 100. The display 103 may be configured to present data in a graphical and/or character format (e.g., alphanumerical, symbolic, or the like format). The user input devices may include any of a number of devices allowing the user computer system 30 to transmit data, such as a keypad, keyboard, touchscreen, touchpad, microphone, mouse, joystick, other pointer device, button, soft key, and/or other input device(s). The user computer system 30 further includes a power source, such as a battery, for powering various circuits and other devices that are used to operate the user computer system 30. Embodiments of the user computer system 30 may also include a clock or other timer configured to determine and, in some cases, communicate actual or relative time to the controller 58.

As used herein, the memory 102, as previously described with respect to the memory 24 of the controller 58, includes any computer readable medium (as defined herein) configured to store data, code, or other information. The memory 102 may include volatile memory, such as volatile Random-Access Memory (RAM) including a cache area for the temporary storage of data. The memory 102 may also include non-volatile memory, which can be embedded and/or may be removable. The non-volatile memory 102 can additionally or alternatively include an electrically erasable programmable read-only memory (EEPROM), flash memory or the like.

The memory 102 can store any of a number of applications or code thereof, which comprise computer-executable instructions/code executed by the processor 100 to implement the functions of the user computer system 30 and/or the door system 40, and/or one or more of the process/method steps described herein. For example, the memory 102 may include system specific applications or APPs or such applications as a conventional web browser application. In some embodiments, the user computer system 30 is capable of providing graphical and/or character depictions of the operating parameters of the door system 40. The graphical and/or character representations allow the user to set or adjust the operating parameters of the door system 50.

In some embodiments, the user computer system 30 includes a wireless communication interface 106, such as a wireless communication chip, that communicates with a wireless communication interface 26 over a wireless connection 32, such that the user computer system 30 communicates with controller 58 directly without requiring access to an external network (e.g., Wi-Fi network, the cellular network or other network), or otherwise, through such an external network. As previously described, the controller 58 may be directly coupled to and may directly communicate with the user computer system 30 over wireless connection 32. The communication interface 106 may communicate using a wireless networking protocol such as WiFi based on the Institute of Electrical and Electronics Engineers (IEEE) 802.11 standards. Bluetooth short-wavelength UHF radio waves in the ISM band from 2.4 to 2.485 GHZ, a proprietary interface or other wireless access technology that is compatible with the protocol used by the controller 58 whether or not such protocol is described herein.

The user computer system 30 may also be configured to communicate with an external source such as a help desk associated with the door system 40 over a wider communications network. In this regard, the user computer control 30 may be configured to operate with one or more air interface standards, communication protocols, modulation types, and access types. By way of illustration, the communication interface 106 of the user computer system 30 may include a transceiver 108 that may be configured to operate in accordance with any of a number of first, second, third, and/or fourth-generation communication protocols and/or the like. For example, the user computer system 30 may be configured to operate in accordance with second-generation (2G) wireless communication protocols IS-136 (time division multiple access ('PUMA)), GSM (global system for mobile communication), and/or IS-95 (code division multiple access (CDMA)), or with third-generation (3G) wireless communication protocols, such as Consolidated Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols, fifth-generation (5G) wireless communication protocols, and/or the like. The user computer system 30 may also be configured to operate in accordance with non-cellular communication mechanisms, such as via a wireless local area network (WLAN) or other communication/data networks. While the communication interface 106, the display 103, and/or the transceiver 108 are shown as separate blocks in FIG. 4, these components may be a single physical component, be within one or more physical components, or the functionality of these components may be shared.

Figure 8:
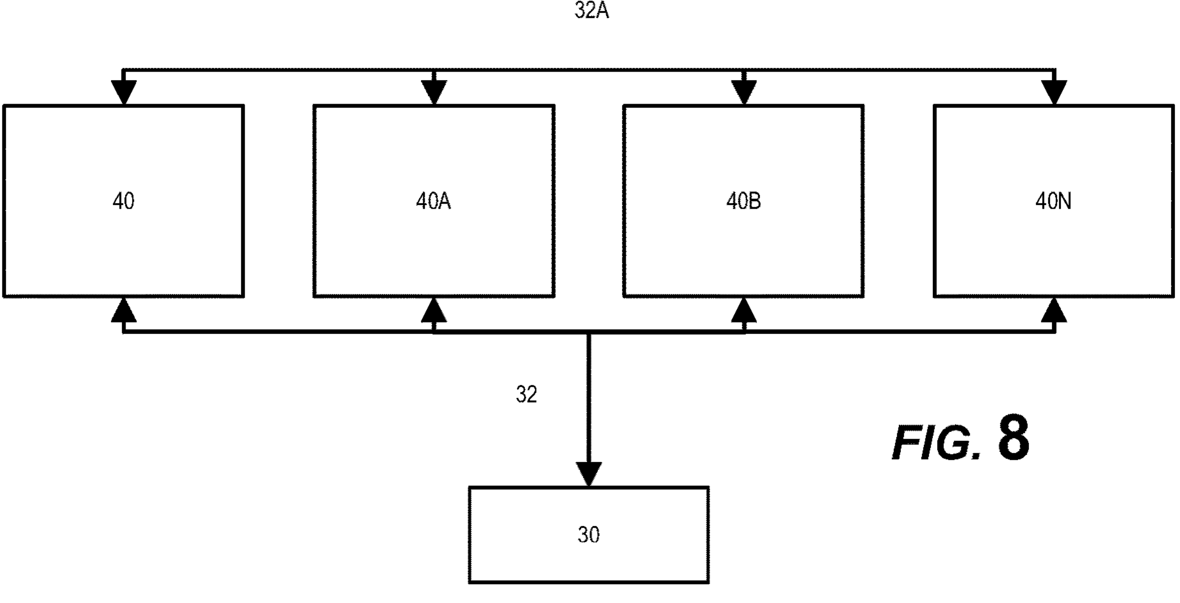
FIGS. 8 and 9 are block diagrams illustrating alternate network architectures of the smart setup system, in accordance with some embodiments of the disclosure.
Figure 9:
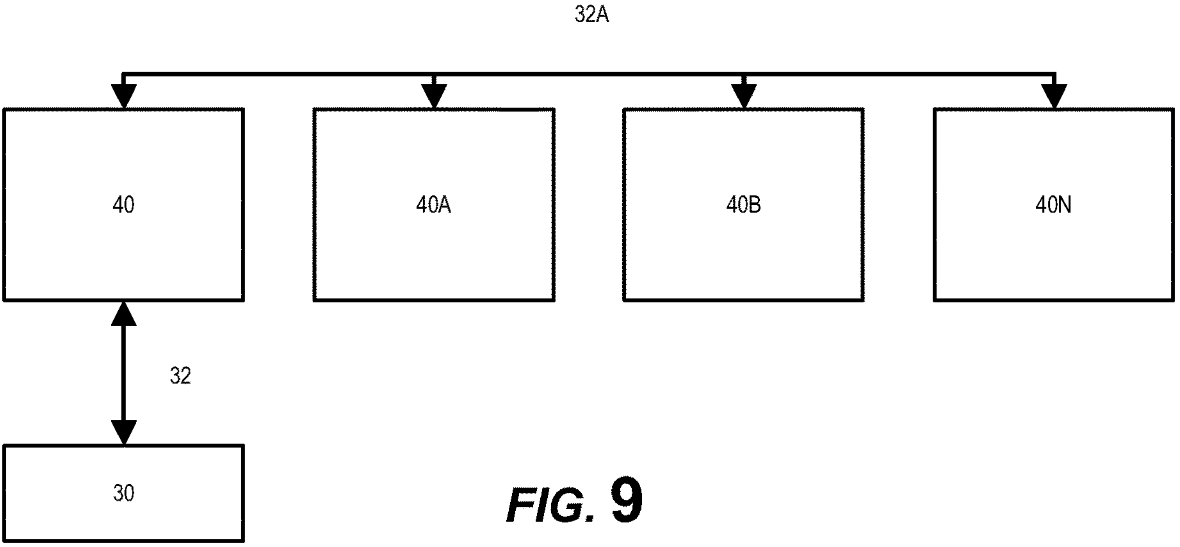

Providing the user computer system 30 with the functionality to communicate over a wider network may not be required for communicating with the controller 58 in order to set up the operating parameters of the door system 30. However, providing such functionality allows the user computer system 30 to communicate with a help desk, retrieve installation instructions from the door system 40 manufacturer over the internet and otherwise send and retrieve information to a node other than the door system 40. Referring to FIGS. 8 and 9, in addition to communicating with the user computer system 30, the communication interface 26 of the door system 40 may communicate directly with other door systems 40 such that operating parameters may be set at one door system 40, the primary door system, and those settings may be transmitted via the communication interfaces 26 over additional wireless connections 32*a* . . . 32*n* to other door systems 40*a* . . . 40*n* (e.g., replica door operators). In this manner the user has the capability of installing and setting up multiple door systems 40 by accessing the operating parameters of a single door system 40 from the user computer system 30. The door systems 40 may be arranged in a primary-replica network or in a peer-to-peer network or using other network architectures where the door systems 40 may be individually addressable. Furthermore, the user computer system 30 may also be used to set the operating parameters for the plurality of door systems 40 in order to control the access that a plurality of users have with respect to each door system 40. That is, the door systems 40 may have operating parameters set to allow certain users (e.g., as defined based on a user device, or the like) to use some door systems 40, while preventing use of other door systems 40 (e.g., preventing ingress and egress for certain users for certain door systems 40).

Figure 10:
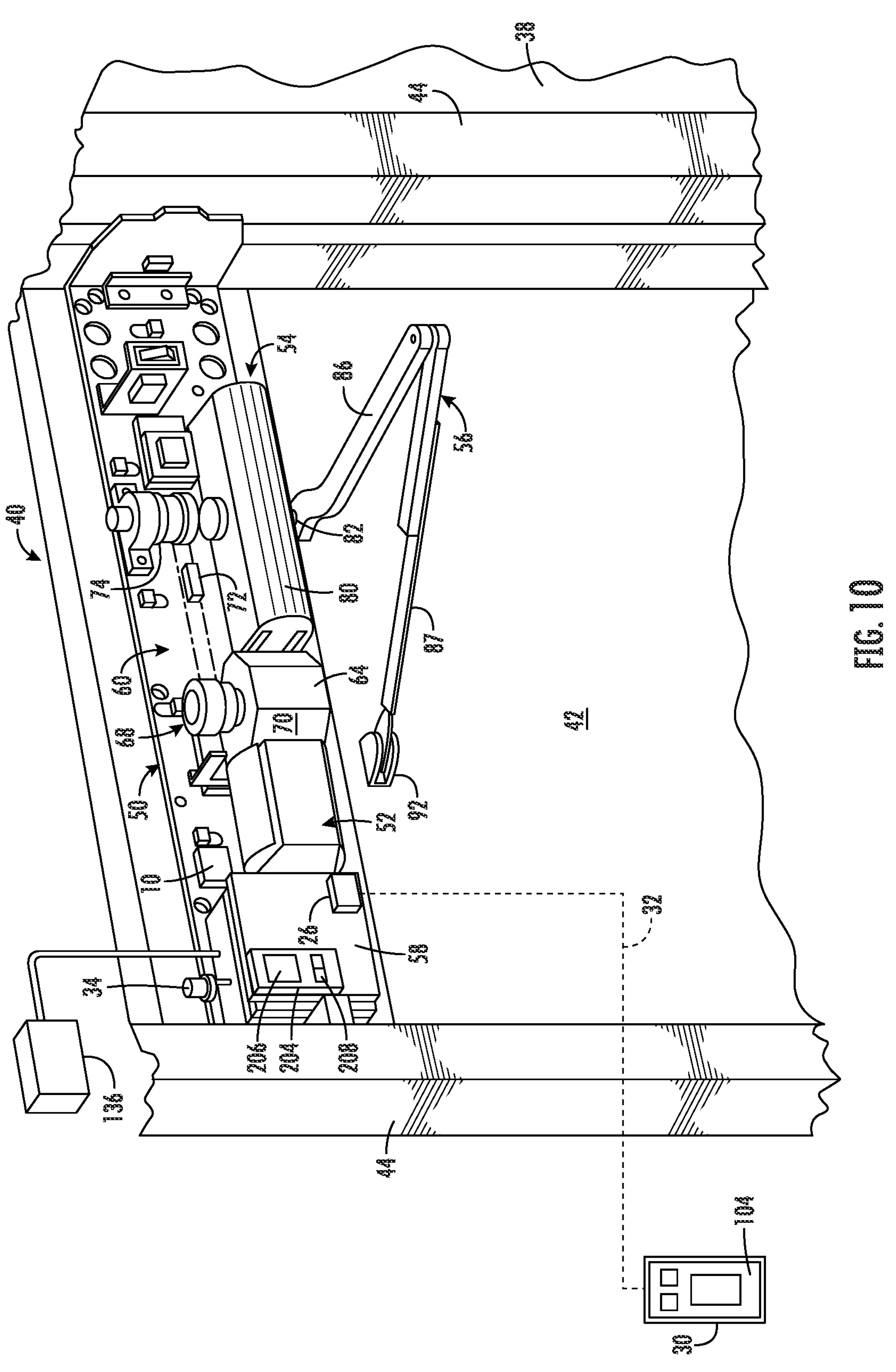
FIG. 10 is a door operator embodying the smart setup system, in accordance with some embodiments of the disclosure.

In the embodiments described above, a user computer system 30 is used to connect to the door system 40 through one or more user interfaces 104 in a display 103 of the user computer system 30. However, the user may not have a wireless enabled user computer system 30, or access to a user computer system 30. In these situations, it may be desirable to provide components (e.g., devices, interfaces, or the like) that allow a user to communicate with the door system 40 directly (e.g., without the need for the user computer system 30). As shown in FIGS. 1, 3 and 10, the door system 40 may be provided with an onboard control 204 in addition to, in place of, or as a part of the communication interface 26. The onboard control 204 may comprise one or more control output devices 206 and/or one or more control input devices 208. For example, the control output devices 206 may include one or more displays and one or more audio devices (e.g., a speaker/microphone, or the like), which are operatively coupled to the processor 22. The one or more displays may be configured to present data in a graphical, alphanumerical, character, and/or other like format. The one or more displays may include any type of display, such as but not limited to an LCD, plasma, LED, electroluminescent, electronic paper, digital light processing technology, LCoS, field emission, laser TV, Quantum Dot, interferometric modulator, flexible display, vacuum fluorescent, seven segment, Retina, OLED, TFT, AMOLED, and/or any other type of display. It should be understood that the one or more displays may be operatively coupled to the communication interface 26, and/or the other components in the controller 58, such that instead of and/or in addition to, communicating wirelessly with the user computer system 30, the user interfaces 104 (e.g., as described in further detail below) or other like interfaces, may be presented on the display of door system 40. The control input devices 208 may include any of a number of devices allowing the onboard control 204 to receive and transmit data inputted by a user. The control input devices 208 may include a keypad, keyboard, touchscreen, touchpad, microphone, mouse, joystick, other pointer device, button, switch, toggle, soft key, and/or other input device(s). It should be understood that in addition to the control input devices 208 that may be a part of a control 204 within the controller 58, the controller 58 may include other controller inputs 140 (e.g., connections to which devices may be connected) as will be described in further detail below.

It should be understood that the control 204, such as the one or more control output devices 206 and/or the one or more control input devices 208, allows for the functionality of the smart setup system as described herein even if a wireless connection and/or user computer system 30 are not available to the user. As such, the user may utilize the one or more control output devices 206 and/or the one or more control input devices 208, and the other components of the controller 58 in order to define the operational parameters (e.g., make initial set-up configurations, adjust the present configurations, and/or the like), as will be described herein.

The door system 40 may be provided with default settings for the operating parameters such that absent instructions from the user computer system 30 the default settings control the operation of the door system 40. The default settings may be changed by the user using the user computer system 30 and/or the door system 40 itself, such that the door system 40 may be programmed to have customized operating parameters. In some embodiments, the user may change each individual operating parameter and/or may select from a plurality of operating parameter sets, which provide different pre-selected operating parameters based on the type of door system 40, the type of installation, the regulations which the door system 40 should meet. In some embodiments, in order to define the operating parameters, a menu is displayed on a user interface of the user computer system 30 and/or the one or more output devices 206 of the door system 40 that leads the user through a menu of operating parameters that may be programmed by the user to control operation of the door system 40, as will be described in further detail below.

A wide variety of operating parameters may be controlled using the system of the present disclosure. Example operating parameters are described herein; however, the list is not exhaustive and other operating parameters in addition to, or in place of, those described herein may be controlled. The door system 40 may be controlled to adjust the opening and closing speed of the door. The door system 40 may be controlled to adjust for the size and/or weight of the door. The door system 40 may be controlled to compensate for wind and/or stack pressure caused by the flow of air through a building. The door system 40 may be controlled for latch retry. The door system 40 may be controlled for electronic dampening. The door system 40 may be controlled for left/right opening doors. The door system 40 may be controlled based at least in part on communication with various door system inputs, such as sensors (within the door system and/or operatively coupled to the door system outside of the door system), such as motion detectors, to control the safe operation of the door. The door system 40 may be controlled for whether the door system 40 operates based on an external activation device 136 (e.g., a switch) or operates with a slight movement of the door toward the open position, such as when a user pushes or pulls on the door. The door system 40 may be controlled to operate on both activation of an external activation device 136 and movement of the door. The system 40 may be controlled for obstruction detection, and delay sensitivity may be set and/or adjusted. For example, during the opening cycle, the door may be controlled to press against an obstruction for the obstruction delay time set and then to close normally. During the closing cycle, the door may be controlled to press against an obstruction for the time set and then to attempt to reclose. If the obstruction is still present, power to the motor may be turned off such that only a spring force pushes the door against the obstruction. The door system 40 may be controlled so that a "latch boost" feature can be adjusted such as to "Off", "Low", or "High." For example, if during the last few inches of door closing, the door does not close due to mechanical door issues, environment issues, and the like, additional closing force can be added to close the door. The additional force may be adjustable. The door system 40 may be controlled to adjust the time the door is held at the fully open position. The door system 40 may be controlled to have a delayed start where the delay to the motor start can be set in increments to allow unlocking of electric hardware. The door system 40 may be controlled for alarm delay. The door system 40 may be controlled to set the closed and open position of the door. While a number of operating parameters have been described above, any operating parameter of the door system 40 may be defined (e.g., set and/or adjusted) using the user computer system 30 over the wireless connection 32, or through the use of the one or more output devices 206 and/or the one or more input devices 208 of the door system 40.

As will be described in further detail with respect to FIG. 5*b* below, the operating parameters may be set for operation with respect to the detection and authentication of one or more specific users. That is, the door systems 40 may be set for operation based on the identity of the user, user device of the user, (e.g., user computer systems 30, access control devices, or the like), and/or user action of the user trying to use the door for ingress and egress. That is, the door system 40 may only operate in accordance with operation parameters that are assigned to one or more users. As such, the door system 40, or a component thereof or operatively coupled thereto, may detect the presence of a user, a user device, the occurrence of a user action, and/or movement, identity, and/or biometrics of a user, and in response operate the door (or prevent the door from operating). It should be understood that the operating parameters for detection and authentication may be set by the user at the location of the door system 40 and/or may be set remotely from a decentralized user computer system 30 and/or from a centralized user computer system 30.

In addition to defining the operating parameters, the door system 40 may communicate with the user computer system 30 and/or other systems (e.g., door system owner systems, maintenance provider systems, or the like) to track and monitor operation of the door system 30. For example, the number of open/close cycles the door system 40 has experienced can be recorded and transmitted to the user computer system 30 and/or other systems. The battery performance can be recorded and transmitted to the user computer system 30 and/or other systems. The identity of the door users that are using the door for ingress and egress or are simply passing by the door, as well as the frequency, time, duration, of such use or non-use may also be captured, stored, and/or communicated as necessary for security or other purposes. For example, the use and non-use of the door by individual users or users in generally, may be utilized for pattern recognition in order to determine when and how to allow activation of the door system 40. Other operating performance issues may be tracked, monitored, and transmitted to the user computer system 30 and/or other systems.

To monitor the proper installation of the door system 40 and door 42, the door system 40 may include sensors 8 that may provide feedback to the user computer system 30 and/or the one or more control output devices 206 of the door system 40 (FIG. 3). For example, the door system 40 may receive a signal from a sensor 8 that senses an installation condition of the door system 40. For example, an accelerometer 10 may be provided in the door operator 40 where the accelerometer 10 communicates with the controller 58. The accelerometer 10 performs a level test where the level of the door operator 40 is detected and a corresponding signal is transmitted to the controller 58. The level condition may be communicated (e.g., in a notification, or the like) to the user computer system 30 and/or the one or more output devices 206, such that the installer can determine if the door system 40 is installed properly. Similarly, a force detection sensor 12 may be provided that detects the amount of force required to open and/or close the door 42. If the force is above a predetermined level, the system may, for example, determine that the hinges are binding, the linkages of the door operator are not properly installed, or the like. For example, the force detection sensor 12 may be provided in the door system 40 that communicates with the controller 58. The force detection sensor 12 transmits a signal indicative of the force required to open the door to the controller 58. The force level may be communicated to the user computer system 30 and/or to the one or more output devices 206 such that the installer can determine if the door is installed properly. Alternatively, the controller 58 may do a comparison between the actual force as detected by sensor 12 and a desired force, and send an error message to the user computer system 30 and/or to the one or more control output devices 206 if the actual force as detected by sensor 12 exceeds a desired force limit. Various inputs such as sensors 10 and 12 (and other detection sensors 14, as will be discussed in further detail later) may be operatively coupled (e.g., connected to) the controller 58 at inputs 140 (e.g., connectors to which a device is connected) or may be integral within the door system 40. The inputs 140 may be programmable such that various devices (e.g., sensors 8, or the like) may be connected to any one of the inputs 140. In other embodiments the sensors 8 may be integrally operatively coupled to the door systems 40 or wireless communicate with the door systems 40. While sensors 10, 12, 14 are examples of such devices, the devices may include other devices or systems such as security systems/devices, fire protection systems/devices, activation devices 136, vestibule/door interlock systems, HVAC control, door synchronization, locks, exit devices, wall plates, or the like.

Figure 5A:
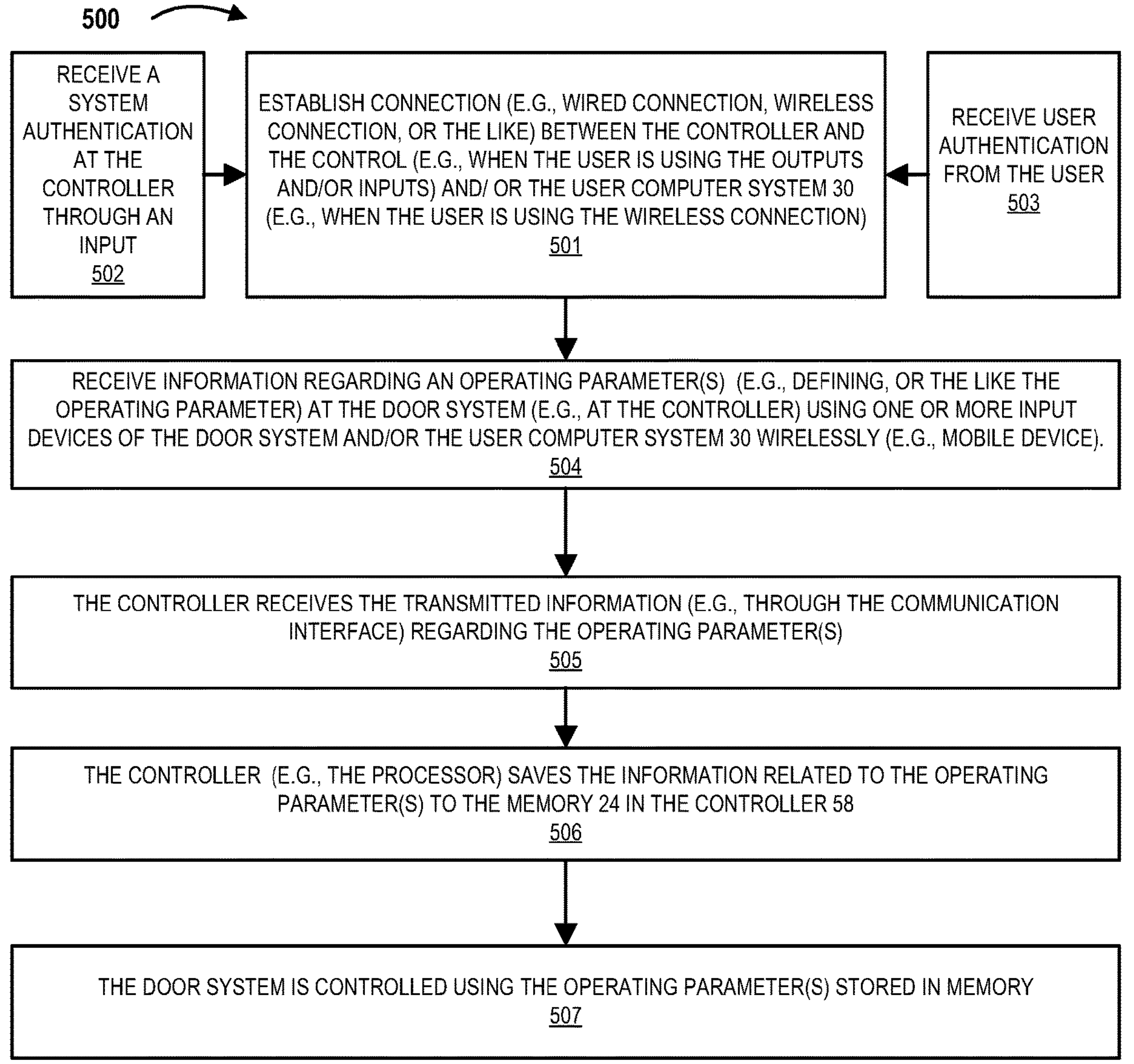
FIG. 5*a* is a block diagram illustrating a method of using the smart setup system, in accordance with some embodiments of the disclosure.

A method of setting up and operating a door system 40 is described in FIG. 5*a* with respect to the use of the user computer system 30 and/or the control 204 of the door system 40 by a user. It should be understood that a connection (e.g., a wired connection, a wireless connection 32, or the like) between the controller 58 and the control 204 and/or the user computer system 30 is established, as illustrated by Block 501 of FIG. 5*a*. When the connection is a wireless connection, the wireless connection 32 may or may not be of a limited range and may be a direct connection or intervening network components may be present. In some embodiments, the wireless connection 32 is a direct connection over a limited range. For security purposes, establishing the wireless connection may comprise receiving system authentication at the controller 58 through an input (e.g., inputs 140, one or more control input devices 208, and/or other input), as illustrated in block 502 of FIG. 5*a*. For example, establishing the wireless connection may comprise receiving an action with respect to the input of the door system 40. For example, the action may require the on/off input to be toggled on and off two, three, four, or the like times in order to activate the wireless connection interface 26 and to thereafter allow the user computer system 30 to make a wireless connection 32 to the controller 58. To further enhance security, the system may further receive a user authentication at the controller 58 through the control 204 and/or through the user computer system 30 (or through another system that communicates with the controller 58) to authenticate the user, as illustrated in block 503 of FIG. 5*a*. For example, a user may enter a code into an input device 208 of the door system 40, and/or into the user computer system 30 when the user is accessing the door system 40 through a wireless connection 32.

Information regarding at least one operating parameter is transmitted to and received by the door system 40, as illustrated by blocks 504 and 505 of FIG. 5*a*. For example, the information is transmitted by the user using one or more control output devices 206 and/or one or more control input devices 208 of the door system 40. Alternatively, or additionally, the information related to the operating parameter may be transmitted to the door system 40 through the user computer system 30 to the controller 58 over the wireless connection (e.g., direct or indirect connection). The information that is transferred to and received by the door system 40 may be the operating parameter itself, a value related to the operating parameter, activation of an operating parameter (turning an operating parameter on/off), or the like.

As illustrated in block 506 of FIG. 5*a*, the information regarding the operating parameter is saved by the controller 58 such as in memory 24 (e.g., using the processor 22 in the controller 58, or the like). As previously discussed herein, the controller 58 controls the operation of the door system 40, such as the operation of the drive system 52 of the door system 50 in the future using the information regarding the at least one operating parameter, as illustrated in block 507 of FIG. 5*a*.

Figure 6B:
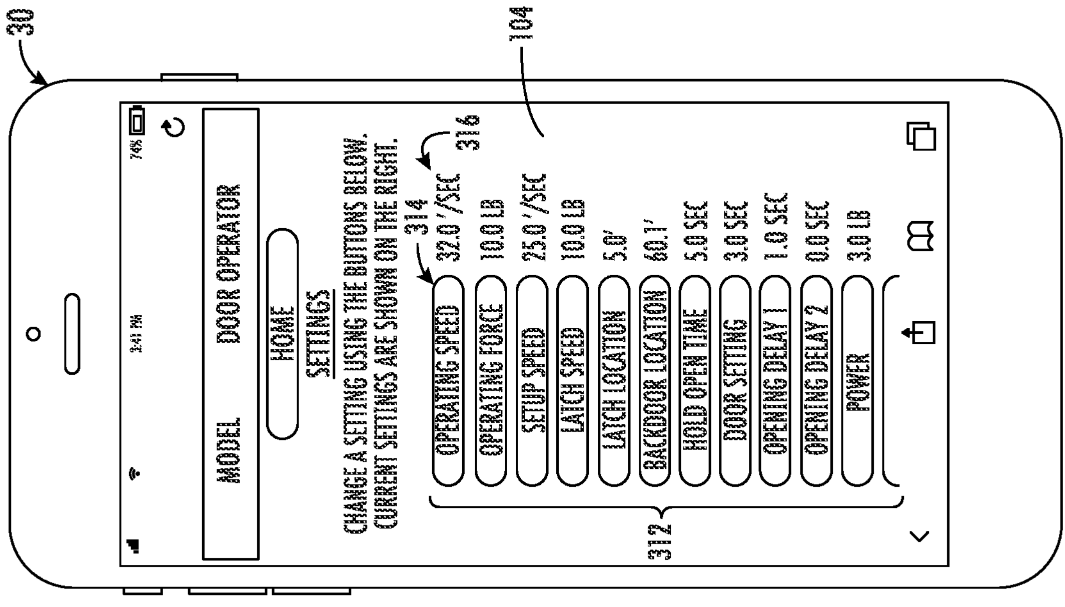
Figure 6A:
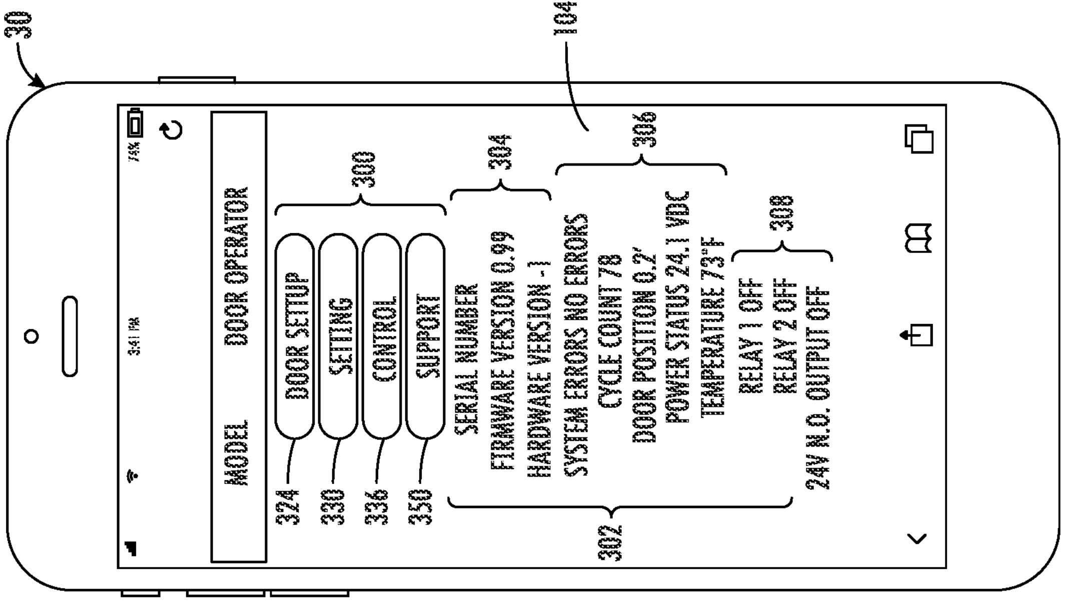

As previously discussed herein, the user computer system 30 and/or the one or more output devices 206 may display various menus, icons, and other information to the user on one or more user interfaces). The user can access (e.g., scroll through, or the like) menus and icons displayed on a user interface to input information to, and receive information from, the controller 58. Referring to FIG. 6A, an example screen shot is shown illustrating a user interface 104 on a display 103 of a user computer system 30. The screen shot. of FIG. 6A may be an initial home screen that presents a user with a menu 300 for adjusting or setting the operating parameters of a door system 40 that is in communication with the user computer system 30. The home screen may also present the user with information 302 about the door system 40. The information 302 may include identifying information 304 about the door system 40 such as Serial Number, software Version, hardware Version or the like. The information 302 may also include status information 306 about the status of the door system 40 as installed. For example, the status information 306 may include whether any System Errors are detected. These errors may be based on the sensors or diagnostics performed by the controller 58. The status information 306 may include Cycle Count that indicates use. The status information 306 may include Door Position that indicates, for example, the position of the door system 40. The status information 306 may include other information such as Power Status or Temperature that may be used to determine faulty operating conditions. The information 302 may also include information 308 about the configuration of the door system 40 itself such as Relay or battery conditions.

The user may access the control system using the menu 300. For example, assuming that the door system 40 has been installed properly, the user may want to change one or more of the operating parameters. The user may access the "Settings" menu to change the operating parameters by depressing the "Settings" button 310 on the home screen. In the illustrated embodiment, the buttons are soft buttons provided on a touch screen; however, any suitable user input may be used. FIG. 6B shows an example "Settings" menu 312 that may be presented to the user. The "Settings" menu 312 provides a list of user controllable operating parameters. The list of operating parameters is made by way of example and in use the operating parameters may be different than those specifically listed in FIG. 6B. In addition to the buttons 314, the screen may present a value 316 for each operating parameter. The values 316 may be preset values or the values may have been set by the user during initial door setup. The user may select one or more of the operating parameters. For explanatory purposes, assume the user selects "Opening Speed." The remote control will then display the "Opening Speed" control screen as shown in FIG. 6C. The user may adjust the opening speed using controller 318 and may save the change by pressing the "Save" button 320. In this embodiment, the information provided to the door operator 40 from the user computer system 30 is an identification of the operating parameter to be changed and the value (e.g. speed) of the operating parameter. The settings are stored in memory 24. The controller 318 is shown as an adjustable slider; however, any suitable control may be used. While speed is used as the example for setting an operating parameter, it should be understood that the operating parameter may be related to one or more users being authorized (and the type of authentication required) for the one or more users to use the door for ingress and egress. After the operating parameters are set, the user may return to the "Home" page by depressing the "Home" button 322.

From the "Home" page, FIG. 6A, the user may press the "Door Set Up" button 324. The Door Set Up button 324 may take the user to a door set up screen as shown in FIG. 6D. The door set up screen may take the user through a series of door set up menus to initialize the operating parameters of the newly installed door. It should be noted that the "Settings" menu (FIG. 6B) may also be accessed during the door set up process to set the initial operating parameters. FIG. 6D illustrates one door set up parameter. As illustrated, the door set up parameter sets the door open position and the door closed position. To use the door set up menu the door is closed and the "Set Closed Position" button 326 is pressed such that the door system 40 is programmed to recognize the position of the door system 40 at the door closed position. Similarly, the door is opened (e.g., moved to the fully open position, or the like) and the "Set Open Position" button 328 is pressed such that the door operator 40 is programmed to recognize the position of the door system 40 at the door open position. These positions are stored in memory 24. The "Learn" button 330 may be pressed such that the system completes a test or a series of tests to determine certain characteristics of the door such as door weight and size (inertia) and door system spring setting. If the door operator 40 is able to property complete the tests, the user is instructed to press the "Refresh" button 332 to save the settings in memory of the controller 58. The user may return to the "Home" page by depressing the "Home" button 334. If the operator was not successful in completing the test the user may re-run the test(s) after making adjustments to the door system 40, the door 2, and/or associated components.

From the "Home" page, FIG. 6A, the user may press the "Control Inputs" menu button 336. The Control Inputs button 336 may take the user to an External Inputs menu 338 as shown in FIG. 6E. The External Inputs menu allows the user to set the various inputs 140 of the door system 40. For example, the various sensors 8 activation devices 136, or the like as described herein, in addition to other inputs such as from fire control systems, alarm systems or the like, may be connected to the inputs 140 of the door system 40. The External Inputs menu 338 allows the user to designate specific inputs 140 for the various input devices connected to the system using the Assign Inputs button 340. This allows the door operator 140 to be customized for a particular user's needs and integrated into other systems. The user is instructed to press the "Refresh" button 342 to save the settings. The user may return to the "Home" page by depressing the "Home" button 344.

From the "Home" page, FIG. 6A, the user may press the "Support" menu button 350. The Support button 350 may take the user to the manufacturer's web site or other external site such as over an Internet connection where the user may be provided technical support for the installation and setup of the door system 40.

In the embodiments described above with respect to FIGS. 6A-6D, a user computer system 30 is used to connect to the door system 40 through the user interface 104.

However, as also described above, the user may not have, or have access to, a wireless enabled user computer system 30. In such situations, it may be desirable to provide the control 204, including the one or more input devices 206 and/or one or more output devices 206 within the door system 40. As such, the one or more output devices 206 may be used to provide the user interfaces (e.g., as described with respect to FIGS. 6A-6B) as part of the door system 40. In this manner, the functionality of the smart setup system as described herein may be provided even if a wireless connection and/or user computer system 30 are not available to the user.

After the smart set up system is used to set up or change the operating parameters of the door system 40, the door system 40 may be utilized by a user in accordance with the operating parameters of the door system 40. FIG. 5*b* illustrates a method of using the smart door system for authentication and activation, in accordance with some embodiments of the disclosure.

In particular, as illustrated by block 602 in FIG. 5*b*, the door system may identify the presence of a user device. As previously described herein the user device may be a user computer system 30 (e.g., a smartphone, smart wearable device—smartwatch, smart glasses, or the like) or the user device may be an access control device. The access control device may be a badge (e.g., an electronic badge), a card (e.g., electronic card—RFID, NFC, or the like), a fob, a key (e.g., electronic key), any other control device that is or is not wirelessly enabled, and which may be used to operate the door system 30 and/or another component of the door (e.g., electronic lock). The door system 40 may identify the presence of the user device in any number of ways, such as through the use of one or more door input devices 208. The one or more door input devices may be the communication interface 26 itself, and/or may communicate with the communication interface 26. As such, the door input devices 208, as described herein, may be activation devices 136, sensors 8, security devices, or the like. The door input devices and/or the communication interface 26 may identify that the user device is near the door system 40, may communicate with the user device, and/or may capture information from the user device (e.g., wirelessly communicate with the user device, capture information from the user device without wireless communication, utilize both wireless and other information capture means, or the like).

In some embodiments, the user device may be a user computer system 30, such as a smartphone, smart wearable device (e.g., a watch, or the like), or the like that communicates with the door system 40 when the user computer system 30 is in range of the door system 40. It should be understood that the user computer system 30 may commentate directly with the door system 40 and/or through the use of an application that is running on the user computer system 30. In some embodiments (as will be discussed in further detail with respect to block 608), the door system 40 (e.g., through the door input device, or the like) may determine if the user device is moving closer to the door (e.g., indicating that the user may want to activate the door) or if the user device is moving past the door (e.g., as parallel to the door, near the door, away from the door, or the like) indicating that the user may not want to activate the door.

As illustrated by block 604, in addition to identifying the presence of the user device, the door system 40 may identify user device information. For example, the door system 40 (e.g., the input device and/or communication interface 26 of the controller 58) may receive (e.g., pull from or receive a push of) user device information, such as a user device identifier. The user device identifier may provide information about the user device in the presence of the door system 40. The user device identifier may be a string of characters (e.g., letters, numbers, symbols, or the like), a signal, private public keys, codes, or any other type of identifier, which in some embodiments may be encrypted for security purposes. In some embodiments instead of a user device identifier, the user device information may include the user name, a user identifier, or the like for the user assigned to the user device. In this way the user device information may be utilized to identify the user to which the user device is assigned.

FIG. 5*b* further illustrates in block 606 that the door system 40 (e.g., the input device and/or communication interface 26 of the controller 58) may receive an authentication action from the user device. The authentication action may be any action taken by the user using the user device, and in some embodiments may be described as a "knowing act." For example, the authentication action may be the user signing into an application on the user device; entering a password into the user device; selecting a feature (e.g., button, link, or the like) within the application; selecting an input on the user device (e.g., button, pressure sensitive screen, or the like); performing an action with the user device (e.g., swiping the user device in a reader, placing the user device near a reader, or the like); making a gesture with the user device (e.g., shaking the user device, moving the user device in a pattern, making a movement on a touchscreen of the user device, or the like); allowing the user device to scan the user (e.g., face, fingerprint, palm, or the like scan); making a voice command in the user device (e.g., in the user computer system 30); and/or another authentication action not specifically described herein.

In some embodiments, it should be understood that in addition to or instead of the door system identifying the presence of the user device (e.g., as described in block 602), identifying information from the user device (e.g., as described in block 604), and/or receiving authentication from the user device, the door system 40 may be activated by the user's voice commands (e.g., an "open door command," or the like). For example, when approaching the door system, the user may speak the phrase "open door", (or another like phrase) and the door system 40 (e.g., through a sensor 8, such as a microphone, or the like) or the user device (e.g., through a microphone and the processor passes the communication to the door system 40) receives the command and the door system 40 may open the door as requested. However, as previously described, the door system 40 may identify information from the user device (as described in block 604) and/or require authentication from the user (e.g., as described in block 606) before activating the door.

Block 608 further illustrated in block 608 that in some embodiments, one or more detection sensors 14 may be used to detect a user condition of the user, such as to detect the movement of the user, the identity of the user, biometric information of the user, or the like. As previously discussed herein the one or more detection sensors 14 may be operatively coupled to the door system 40, such as, may be integral with the door system 40 or may be removably coupled to the door system 40 through a wired or wireless connection. For example, the one or more detection sensors 14 may comprise one or more movement sensors, such as, a camera, infrared, motion sensor, movement sensor, light curtain, pressure pad, or the like sensor that may detect the movement of a user near the door (e.g., at a door or passing by a door). Alternatively, or additionally, the movement of the user near the door may be determined by tracking the movement of the user device of the user near the door. The one or more movement sensors and/or the movement of the user device may be utilized in order to determine if the user is going to access the door or if the user is merely passing by the door.

The one or more detection sensors 14 may be one or more identification sensors, such as a camera (e.g., video and/or still, or the like) which may be used to detect the identity of the user. The one or more identification sensors may use of facial recognition, identification of the physical appearance of the user (e.g., type of clothes, color of clothes, location of clothes, pattern, logos, size, or the like, height, hair color, hair length, features, or the like), or other like identification information. Identification of the user may be utilized in order to allow or prevent the access of a particular user or a type of user to a particular door.

The one or more detection sensors 14 may be one or more biometric sensors, such as an infrared, retina, camera, microphone, or other like sensor. The one or more biometric sensors may be used to provide temperature detection, an indication of a user being sick (e.g., cough, or the like), voice recognition, height (or other physical features), or the like of users near the door, which may be used to allow or prevent the access of a particular user (e.g., from voice recognition) or type of user (e.g., determining users that have temperatures above or below 100 degrees Fahrenheit, or the like) to a particular door.

It should be understood that in some embodiments, a sensor 14 may serve two purposes, such as a camera may provide for identifying a user and for determining the motion of users. It should be understood that the one or more detection sensors 14 may be used alone and/or in combination with the user computer systems 30 in order to determine if access should be permitted to a user or a group of users. For example, while a user may be typically granted access to a door, it should be understood that the one or more detection sensors 14 may be used to authenticate the user or override the authentication of a user or a group of users, as will be discussed in further detail herein.

Block 610 of FIG. 5*b* illustrates that the door system 40, through the use of one or more door input devices, such as detection sensors 14, may in addition to being utilized to detect specific users near the door, may also be utilized to identify the conditions in an area around the door system 40. For example, the area may include a specific distance away from the door system 40 (e.g., 2, 4, 6, 8, 10, 15, 20 ft, or the like). In some embodiment the conditions being evaluated around the door include the presence of any objects (e.g., other people, inanimate objects, or the like) in the surrounding area around the door. For example, the one or more door inputs devices, such as security device sensors like cameras (e.g., video, stills, or the like), movement sensors, infrared sensors, radar sensors, motion sensors, vision sensors, 3D sensors, laser sensors, light curtains, or the like may be operatively coupled to the door system 40 (e.g., within or adjacent to the door systems) to identify any objects near the door. As such, the one or more door input devices may identify objects, such as people or inanimate objects along with the presence of the user device. In some embodiments the additional people identified in the door surroundings may be unauthorized users (e.g., tailgaters, or the like). As such, the door system 40 may identify if there is an object that should not be present for the operation of the door system 40.

Block 612 of FIG. 5*b* illustrates that the door system 40 (e.g., a door input device) identifies the operating parameters for the door system 40 based on the presence of the user device, the user device information, the authentication action from the user device, the one or more detection sensors 14, and/or the surrounding objects. For example, once the door system 40 has the user device information (e.g., user device identifier, user information, or the like), the authentication action, and/or detected that the user wants to access the door, the controller 58 of the door system 30 may access stored information (e.g., stored locally within the door system 40 memory, stored in a centralized database on a server located apart from the door system 40, or the like). The stored information may include stored user device information for a plurality of users, authentication requirements for the users, and/or operating parameters for the foregoing. Additionally, the stored information may include operating parameters when objects are identified in a surrounding area near the door system 40 (e.g., unauthorized users, or the like). Additionally, the stored information may include override information, such as should a user device and/or authentication be compromised, and the one or more detection sensors identify a non-authorized user (e.g., wearing certain clothes, meeting a physical description, or the like). For example, the stored information may include a list of user device information, how the user device is authenticated (e.g., what action the user is required to take for authentication) and the resulting operation of the door system 40 should a user be identified and authenticated. In some embodiments, the operating parameters may be general operating parameters for all users or a group of users. Alternatively, the operating parameters may be specific for specific users and/or types of users. That is, for example, if the user is a child (e.g., at a school), a patient at a hospital, a user that has an object (e.g., cart, box, wheelchair, gurney, forklift, delivery vehicle, another person, or the like), an elderly person, or other like user, the operating parameters may open and/or close the door more slowly. Alternatively, if the user is an adult, doctor, security personal, or a person without an accompanying object, the operating parameters may open and/or close the door more quickly. In some embodiments, the specific user may have specific operating parameters regarding how the user would like the door system 40 to operate the door. As such, the operating parameters (e.g., speed, force, open time, or the like) of the door system 40 may be changed depending the on the user identified and/or the conditions around the door system 40.

It should be understood that in some embodiments, the operation parameters for an authorized user may be overwritten if unauthorized users and/or unauthorized objects are identified in surrounding areas around the door system 40. As such, the one or more input devices, such as the one or more detection sensors 14, may be utilized to take various actions outside of the normal operating procedures based on the conditions occurring around the door. For example, a door system 40 may not unlock for a user that would have otherwise been authorized user if the security devices detect multiple users within defined area, and at least one of such users is not authorized. In other examples, the door system may not operate to unlock or open a door for an otherwise authorized user on one side (e.g., the secured side—typically the inside) if another user (e.g., unauthorized user) is identified on another side (e.g., located at, approaching, or the like on the second side—typically the non-secured side). In some embodiments, should a user be determined to only be passing by a door, instead of heading towards the door, the door system 40 may not operate (e.g., may be overridden) even if the user device is present and the user has been authenticated. In another example, should a notification (e.g., an alert) be sent to prevent a user with specific physical attributes even if a user device is present and a user is authenticated, the door system 40 may not operate (e.g., may be overridden) when detected by the identification sensor. In another example, when a user is identified has having a particular biometric reading (e.g., a temperature over a threshold value, a cough, or the like), the door system 40 may not operate (e.g., may be overridden).

While FIG. 5*b* illustrates that the authentication action may be taken by the user on the user device before the door system 40 identifies the operating parameters, it should be understood that the once the door system 40 identifies the user device information based on the user device, the door system 40 may identify stored information regarding what authentication is required from the user device, if any. In some embodiments when the door system 40 receives the correct authentication, the door system 40 will operate in accordance with the stored operating parameters. Alternatively, the door system 40 may send a request to the user device (e.g., message the user computer system 30—text message, pop-up window, application alert, or the like) requesting the user to provide the authentication action. The request may include a stored authentication action, a dynamic authentication that the user is required to take, and/or a combination of both. For example, the user may be required to enter a dynamic pin number or take a specific action with respect to the user device in addition to providing the user's typical authentication action, which may increase security related to utilizing the door.

While the embodiments of the disclosure discussed above relate to the use of a single user device, it should be understood that multiple user devices may be utilized by the user in order to activate the door system 40. For example, the user may be required to swipe an access control badge in addition to having the user's user computer system 30. As such, the door system 40 may identify the presence of the user computer system 30 and the authentication action may require the user to swipe a badge to activate the door system 40.

Furthermore, embodiments of the invention may include identifying the presence of multiple user devices at the same time (or within a range of time), thus indicating that multiple users are present (e.g., trying to use the door), and determining the operating parameters for the presence of multiple users. As such, when multiple user devices are present, the door system 40 may identify at least one operating parameter for each of the multiple user devices, and thus, have a pool of multiple operating parameter options (e.g., multiple door opening speeds, forces, time to leave open before closing, or the like). In response the door system 40 may select at least one operating parameter based on the multiple operating parameter options. In some embodiments the at least one operating parameter selected from the multiple operating parameters is determined by comparing the multiple operating parameters options for each of the multiple user devices and optimizing the operation of the door system. For example, the operating parameter that has the longer duration for keeping the door open may be selected (e.g., it would take longer to allow multiple users through the door). Alternatively, should there be users on each side of the door, the door may open at the lowest speed to accommodate the user that has an operating parameter with the lowest speed. In alternate embodiments, the operating parameter may adjusted, changed, and/or a new operating parameter may be created when multiple users devices are identified. That is, should multiple user devices have two different durations for keeping a door open, the door system may use the longer duration operating parameter and apply a factor increase to account for the identification of multiple users. The factor increase may be based on the number of user devices identified. For example, the factor increase in the duration that the door may remain open may be 1.5 times the operating parameter of a single user when two users are present, but it may be 2 times the operating parameter of a single user when 3 users are present. While specific operating parameters may be discussed herein, it should be understood that any operating parameters may be selected, changed, adjusted, or the like when multiple users are identified.

While the operating parameters are also described herein as opening a closed door when an authorized user is identified, it should be understood that the door system 40 may be maintained in other positions (e.g., open) during certain time periods. Accordingly, in some embodiments the activation of the door system 40 may be to close the door and/or lock the door when an unauthorized person is identified.

FIG. 5*b* further illustrates in block 614 that the door system 40 will operate based on the operating parameters identified in accordance with block 612. However, in some embodiments of the invention, during operation of the door system 40, should the one or more door input devices, such as the one or more detection sensors 14, identify that an object (e.g., person or thing) is located in the door operating area (e.g., opening of the door, within the arc of movement of the door, or the like), the authorized user has been compromised (e.g., user device has been taken), the movement of the user changes direction (e.g., instead of movement towards the door the user begins to move away from the door), or the like, the controller 58 of the door system 40 may override the operating parameters of the door system 40. For example, a door system 40 may hold a door open should a user take too long to pass through the door, reverse the movement of the door towards closing should the movement of the user change, locking the door should the user be determined to be unauthorized, or the like.

Moreover, block 616 of FIG. 5*b* illustrates that the door input devices, such as one or more sensors 14, may be further utilized to monitor the use of the door over time. For example, a camera may be utilized to capture an image (e.g., in a video, still photo, live photo, or the like) when users pass through or use a door for security purposes. That is, the user information may be captured for security purposes in order to capture when a user enters an area within a building. Additionally, the door systems 40, user devices, and/or one or more detection sensors 14 may be further utilized to track ingress and egress of users within a building. That is, the door systems may be utilized to identify the users that passed through doors within a building and/or log when the users passed through specific doors (or tried to pass through specific doors).

In other embodiments, the use or non-use of the door by the user, including the movement of a user, may be tracked by one or more detection sensors 14 (e.g., the one or more movement sensors) and/or the user device (e.g., user computer systems 30, or the like) in order to store not only time of day, frequency of use, duration of use or non-use of the door system 40, but the movement of the user around the door (e.g., towards the door, away from the door, passing by the door, or the like). The individual door systems 40, a centralized system, or the like may use the stored user information in order to analyze the use and/or non-use of the doors in order to determine any patterns of the user, a group of users, or the like for a specific door and/or for multiple doors. Moreover, while the movement of a single user may be tracked and analyzed for patterns, the movement of multiple users (e.g, 2, 3, 4, 5, or the like) around the door at the same time may also be tracked and analyzed for patterns. The patterns may be further utilized to set operating parameters (e.g., change, delete, add, or the like) for the user or a group of users. That is, over time the patterns of use for users with specific doors may change based on time, the door being used, the presence of multiple users, objects with the user (e.g., carts, or the like), movement of the user around the door, or the like. As such, the operating parameters of a specific user or group of users for a door or a group of doors may be different based on when a user is near a door, how a user is moving, what the user has (e.g., cart, box, or the like), or the like. It should be understood that the door systems 40, the one or more detection sensors 14, and/or the user devices may be monitored (e.g., periodically, continuously, and/or the like) in order to change the operating parameters of the door systems 40 over time (e.g., periodically, in real-time, such as instantaneously or within seconds or minutes, or the like) as the patterns of use for individual users or a group of users change.

In some embodiments, the door system 40 may also be operatively coupled to a lock in the door. As such, the user device (e.g., user computer system 30 and/or application thereof) may be utilized to unlock, lock, open and/or close the door as a user approaches the door system 40. As such, the automated movement of the door based on the operating parameters may be controlled in association with the locking and/or unlocking of a door lock.

The door system 40 of the present disclosure provides improvements to current door operators and/or door closers. It should be understood that since door systems are placed at areas of ingress and egress from buildings, they are ideally situated to integrate various security systems directly into the door system, as opposed to having a separate security system (e.g., card swipe, identification reader, RFID, or the like) that operates independently of the door system 40 (e.g., that controls a lock on the door, or the like). As such, the door systems 40 described herein are able to control the actions of the door (e.g. locking and unlocking, controlling the opening and closing of the door), utilizing the door system to operate the ingress and egress based on authentication and activations of users, monitoring the use and non-use of the doors for pattern recognition for improved operation of the door systems 40 for each user, or the like. The integration of these components greatly reduces the costs to securely operate the door and improves the personalization of the operation of the door systems 40. Moreover, the features of the present disclosure may be utilized in various situations, such as in schools to identify authorized children and/or adults that are equipped with a user device causing doors to lock if the user is not an authorized child and/or adult. Other examples of the use of the door system 40 may include equipping patients (e.g., patients with dementia, or other health issues), such that the patients may be allowed or denied access to doors, while other people may freely move through the doors. Furthermore, the use of detection sensors 14 may be used to prevent access of otherwise authorized users when authorized user devices have been compromised, when the authorized user are present at the door but are not going to use the door, when the authorized user has a physical condition that prevents entry (e.g., temperature over a threshold level, is identified as being sick, or the like).

As described herein, the term user may be used generally herein to describe a person that is responsible for installing, setting up, maintaining, and/or changing the operation of a door system 40. In such situations the user may be referred to as an installation user or service provider user. Alternatively, when describing a user that is trying to pass through the door using the door system 40, the user may be referred to as a patron user or operating user.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A door system comprising:

a drive system configured to operate a door, wherein the door is a swinging door and the drive system comprises:
- a motor; and
- a linkage assembly operatively coupled to the motor, wherein the linkage assembly is configured to be operatively coupled to the door, a wall, or a door frame; and a controller configured to control the drive system, the controller comprising:
- a communication interface;
- a memory having computer readable code stored thereon; and
- a processor operatively coupled to the memory and the communication interface, wherein when executed the computer readable code is configured to cause the processor to:
  - capture a physical appearance of a user while the user is moving towards the door or past the door, via one or more door input devices, wherein the one or more door input devices comprise one or more detection sensors that capture the physical appearance;
  - identify physical information of the user from the physical appearance of the user captured;
  - identify a type of user from the physical information;
  - identify at least one operating parameter to optimize for the user based on the type of user, wherein the at least one operating parameter comprises a speed of opening or closing the door, a force for opening or closing the door, or open time for the door; and
  - identify a direction of movement of the user as going to access the door or passing by the door based on the one or more detection sensors that capture the physical appearance of the user;
  - control the drive system based on the at least one operating parameter identified for the user when the direction of movement of the user is identified as going to access the door; and
  - prevent opening of the door when the direction of movement of the user is identified as passing by the door.

2. The door system of claim 1, wherein the one or more detection sensors capture one or more images of the user to identify the physical information of the user.

3. The door system of claim 2, wherein the one or more images comprise a video, still photo, or a live photo.

4. The door system of claim 1, wherein identifying the at least one operating parameter further comprises:

identifying the at least one operating parameter stored in the memory of the controller based on the type of user.

5. The door system of claim 1, wherein when executed the computer readable code is further configured to cause the processor to reverse the movement of the door from opening to closing when the direction of movement of the user changes from accessing the door to passing by the door.

6. The door system of claim 1, wherein the at least one operating parameter for the user is based on a pattern of movement of the user or a plurality of users over time.

7. The door system of claim 1, wherein when executed the computer readable code is further configured to cause the processor to:

capture an object via the one or more detection sensors; and wherein identifying the at least one operating parameter is based on the user having the object or the object being located adjacent the user.

8. The door system of claim 1, wherein the type of user is determined based on identifying a child user, an adult user, an elderly user, a user without an object, or a user with an object based on the physical information.

9. The door system of claim 1, wherein the physical information is movement of the user, a height or a size of the user, facial recognition of the user, or a physical feature of the user.

10. The door system of claim 1, wherein the processor is further configured to execute the computer readable code to:

identify a presence of the user based on the one or more detection sensors before capturing the physical appearance of the user.

11. The door system of claim 1, wherein the processor is further configured to execute the computer readable code to:

identify one or more objects in a door area of the door system using the one or more detection sensors during operation of the door system; and changing the at least one operating parameter during operation of the door system based on the identification of the one or more objects in the door area.

12. The door system of claim 1, wherein the one or more detection sensors comprise a camera, a motion sensor, a movement sensor, an infrared sensor, a radar sensor, a vision sensor, a 3D sensor, a laser sensor, or a light curtain.

13. A method of operating a door system comprising a drive system comprising a motor, a linkage assembly operatively coupled to the motor, wherein the linkage assembly is operatively coupled to a door, a wall, or a door frame; a controller having one or more processors, wherein the controller controls the drive system; and one or more door input devices operatively coupled to the controller, wherein the one or door input devices comprise one or more detection sensors, the method comprising:

capturing, by the one or more processors, a physical appearance of a user while the user is moving towards the door or past the door, via the one or more detection sensors;

identifying, by the one or more processors, physical information of the user from the physical appearance of the user captured;

identifying, by the one or more processors, a type of user from the physical information;

identifying, by the one or more processors, at least one operating parameter to optimize for the user based on the type of user, wherein the at least one operating parameter comprises a speed of opening or closing the door, a force for opening or closing the door, or open time for the door; and identifying, by the one or more processors, a direction of movement of the user as going to access the door or passing by the door based on the one or more detection sensors that capture the physical appearance of the user;

controlling, by the one or more processors, a drive system based on the at least one operating parameter identified for the user when the direction of movement of the user is identified as going to access the door; and preventing, by the one or more processors, opening of the door when the direction of movement of the user is identified as passing by the door.

14. The method of claim 13, wherein the one or more detection sensors capture one or more images of the user to identify the physical information of the user.

15. The method of claim 13, further comprising reversing, by the one or more processors, the movement of the door from opening to closing when the direction of movement of the user changes from accessing the door to passing by the door.

16. The method of claim 13, wherein the at least one operating parameter for the user is based on a pattern of movement of the user or a plurality of users over time.

17. The method of claim 13, further comprising:

capturing an object via the one or more detection sensors; and wherein identifying the at least one operating parameter is based on the user having the object or the object being located adjacent the user.

18. The method of claim 13, wherein the type of user is determined based on identifying a child user, an adult user, an elderly user, a user without an object, or a user with an object based on the physical information.

19. The method of claim 13, wherein the physical information is movement of the user, a height or a size of the user, facial recognition of the user, or a physical feature of the user.

20. The door system of claim 7, wherein the object comprises an inanimate thing or an animate thing.

* * * * *